(12) United States Patent
Tsujita

(10) Patent No.: US 10,990,336 B2
(45) Date of Patent: Apr. 27, 2021

(54) IMAGE FORMING APPARATUS EQUIPPED WITH A PLURALITY OF SHEET FEEDERS, CONTROL METHOD THEREFOR, AND PROGRAM

(71) Applicant: CANON KABUSHIKI KAISHA, Tokyo (JP)

(72) Inventor: Kosuke Tsujita, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/181,757

(22) Filed: Nov. 6, 2018

(65) Prior Publication Data
US 2019/0155556 A1  May 23, 2019

(30) Foreign Application Priority Data

Nov. 17, 2017 (JP) .............................. JP2017-221882

(51) Int. Cl.
*G06F 3/12* (2006.01)

(52) U.S. Cl.
CPC ............ *G06F 3/1239* (2013.01); *G06F 3/121* (2013.01); *G06F 3/126* (2013.01); *G06F 3/1222* (2013.01); *G06F 3/1253* (2013.01); *G06F 3/1264* (2013.01); *G06F 3/1285* (2013.01)

(58) Field of Classification Search
CPC ...... G06F 3/1239; G06F 3/121; G06F 3/1222; G06F 3/1253; G06F 3/126; G06F 3/1264; G06F 3/1285; G06F 3/1204; G06F 3/1207; G06F 3/122; G06F 3/1238; B41J 3/46; G06K 15/4065; G06K 15/1823
See application file for complete search history.

(56) References Cited

U.S. PATENT DOCUMENTS

| | | | | |
|---|---|---|---|---|
| 2003/0208607 | A1* | 11/2003 | Yamazaki | G06F 3/1204 709/229 |
| 2005/0270563 | A1* | 12/2005 | Kamata | B41J 3/46 358/1.15 |
| 2009/0184456 | A1* | 7/2009 | Nishii | H04N 1/32502 271/9.01 |
| 2015/0029549 | A1* | 1/2015 | Murata | G06K 15/4065 358/1.15 |
| 2016/0065753 | A1* | 3/2016 | Tachibana | G03G 15/502 358/1.14 |
| 2018/0152572 | A1* | 5/2018 | Yano | H04N 1/00623 |
| 2019/0026049 | A1* | 1/2019 | Aoki | G06F 3/122 |

FOREIGN PATENT DOCUMENTS

JP    2005104614 A    4/2005

\* cited by examiner

*Primary Examiner* — Iriana Cruz
(74) *Attorney, Agent, or Firm* — Rossi, Kimms & McDowell LLP

(57) ABSTRACT

An image forming apparatus aims to prevent sheets in a sheet feeder which is designated for a print job by a user from being used for another print job other than the print job. The image forming apparatus, equipped with a plurality of sheet feeders, executes a submitted print job, prompts a user to select a sheet feeder for use in the print job from among the plurality of sheet feeders, and provides control such that the selected sheet feeder cannot be used for another print job other than the print job.

10 Claims, 33 Drawing Sheets

FIG. 8

LIST OF HELD JOBS

SELECT FILE AND DESIGNATE PURPOSE OF USAGE.

◇ BOX /01: ▼

| ✓ TYPE | SHEET SIZE | PAGE |
|---|---|---|
| ☐ JOB C | A4 | 10 |

↑ UP  ↻ UPDATE    TOTAL: 1   NUMBER OF CHOICES: 1

☐ CANCEL SELECTION    RESERVE SHEET FEEDER — 803

DETAILED INFORMATION ▲ | DISPLAY IMAGE ▲ | EDIT FILE ▲    SEND ▲    PRINT ▲

YOU ARE IN SYSTEM MANAGEMENT MODE.    LOG OUT

| JOB EXECUTION ORDER | JOB NAME | NUMBER | RESERVATION STATUS | LOCK MECHANISM | JOB EXECUTABLE/ NON-EXECUTABLE |
|---|---|---|---|---|---|
| 1 | JOB A | 2 | RESERVED | NOT INCLUDED | YES |
| 2 | JOB B | 3 | RESERVED | INCLUDED | YES |
| | | | | | |
| | | | | | |
| | | | | | |

FIG. 9B

| JOB EXECUTION ORDER | JOB NAME | NUMBER | RESERVATION STATUS | LOCK MECHANISM | JOB EXECUTABLE/ NON-EXECUTABLE |
|---|---|---|---|---|---|
| 1 | JOB A | 2 | RESERVED | NOT INCLUDED | YES |
| 2 | JOB B | 3 | RESERVED | INCLUDED | YES |
| 3 | JOB C | 4 | RESERVED | INCLUDED | YES |
| | | | | | |
| | | | | | |

FIG. 9C

| JOB EXECUTION ORDER | JOB NAME | NUMBER | RESERVATION STATUS | LOCK MECHANISM | JOB EXECUTABLE/ NON-EXECUTABLE |
|---|---|---|---|---|---|
| 1 | JOB A | 2 | RESERVED | NOT INCLUDED | YES |
| 2 | JOB B | 3 | RESERVED | INCLUDED | YES |
| 3 | JOB C | 4 | RESERVED | INCLUDED | YES |
| 4 | JOB D | 1 | RESERVED | NOT INCLUDED | YES |
| 5 | JOB E | 5 | RESERVED | NOT INCLUDED | YES |

FIG. 11A

```
THERE IS NO SHEET FEEDER THAT CAN                    ~1101
BE RESERVED

ALL SHEET FEEDERS ARE RESERVED

TIME PERIODS REQUIRED FOR RESERVATION
OF EACH SHEET FEEDER TO BE CANCELED
ARE AS FOLLOWS

SHEET FEEDER 1: FOUR MINUTES
SHEET FEEDER 2: ONE MINUTE
SHEET FEEDER 3: TWO MINUTES
SHEET FEEDER 4: THREE MINUTES
SHEET FEEDER 5: FIVE MINUTES

```
THERE IS NO SHEET FEEDER THAT CAN                    ~1102
BE RESERVED

ALL SHEET FEEDERS ARE RESERVED
TIME PERIODS REQUIRED FOR RESERVATION
OF EACH SHEET FEEDER TO BE CANCELED
ARE AS FOLLOWS
("-" MEANS THAT PERIODS REQUIRED FOR
RESERVATION TO BE CANCELLED CANNOT
BE CALCULATED)

SHEET FEEDER 1: -
SHEET FEEDER 2: ONE MINUTE
SHEET FEEDER 3: TWO MINUTES
SHEET FEEDER 4: THREE MINUTES
SHEET FEEDER 5: -

| JOB EXECUTION ORDER | JOB NAME | NUMBER | RESERVATION STATUS | LOCK MECHANISM | JOB EXECUTABLE/ NON-EXECUTABLE |
|---|---|---|---|---|---|
| 1 | JOB A | 2 | RESERVED | NOT INCLUDED | YES |
| 2 | JOB B | 3 | RESERVATION CANCELLED | INCLUDED | NO |
| 3 | JOB C | 4 | RESERVED | INCLUDED | YES |
| 4 | JOB D | 1 | RESERVED | NOT INCLUDED | YES |
| 5 | JOB E | 5 | RESERVED | NOT INCLUDED | YES |

| JOB EXECUTION ORDER | JOB NAME | NUMBER | RESERVATION STATUS | LOCK MECHANISM | JOB EXECUTABLE/ NON-EXECUTABLE |
|---|---|---|---|---|---|
| 1 | JOB A | 2 | RESERVED | NOT INCLUDED | YES |
| 2 | JOB B | 3 | RESERVATION CANCELLED | INCLUDED | NO |
| 3 | JOB C | 4 | RESERVED | INCLUDED | YES |
| 4 | JOB D | 1 | RESERVATION CANCELLED | NOT INCLUDED | NO |
| 5 | JOB E | 5 | RESERVED | NOT INCLUDED | YES |

FIG. 17

| JOB EXECUTION ORDER | JOB NAME | NUMBER | RESERVATION STATUS 905 | LOCK MECHANISM | JOB EXECUTABLE/ NON-EXECUTABLE 907 |
|---|---|---|---|---|---|
| 1 | JOB B | 3 | RESERVATION CANCELLED | INCLUDED | NO |
| 2 | JOB C | 4 | RESERVED | INCLUDED | YES |
| 3 | JOB D | 1 | RESERVATION CANCELLED | NOT INCLUDED | NO |
| 4 | JOB E | 5 | RESERVED | NOT INCLUDED | YES |
| | | | | | |

| JOB EXECUTION ORDER | JOB NAME | NUMBER | RESERVATION STATUS | LOCK MECHANISM | JOB EXECUTABLE/ NON-EXECUTABLE |
|---|---|---|---|---|---|
| 1 | JOB A | 5 | RESERVED | NOT INCLUDED | YES |
| 2 | JOB B | 1 | RESERVED | NOT INCLUDED | YES |
| 3 | JOB C | 4 | RESERVED | INCLUDED | YES |
| 4 | JOB D | 2 | RESERVED | NOT INCLUDED | YES |

| JOB EXECUTION ORDER | JOB NAME | NUMBER | RESERVATION STATUS | LOCK MECHANISM | JOB EXECUTABLE/ NON-EXECUTABLE |
|---|---|---|---|---|---|
| 1 | JOB A | 5 | RESERVED | NOT INCLUDED | YES |
| 2 | JOB B | 1 | RESERVED | NOT INCLUDED | YES |
| 3 | JOB C | 4 | RESERVED | INCLUDED | YES |
| 4 | JOB D | 2 | RESERVED | NOT INCLUDED | YES |
| 5 | JOB E | 3 | RESERVED | INCLUDED | YES |

| EXECUTION STATUS | | | | |
|---|---|---|---|---|
| LIST OF JOBS CURRENTLY EXECUTED/ WAITING TO BE EXECUTED | | | | |
| JOB EXECUTION ORDER | JOB NAME | SHEET FEEDER | RESERVATION STATUS | |
| 1 | JOB A | 5 | RESERVED | |
| 2 | JOB B | 1 | RESERVED | |
| 3 | JOB C | 4 | RESERVED | |
| 4 | JOB D | 2 | RESERVED | |
| 5 | JOB E | | | |

RESERVE SHEET FEEDER 2401, 2402, 2403

FIG. 28

| JOB EXECUTION ORDER | JOB NAME | NUMBER | CONFIRMATION PRINT MODE | RESERVATION STATUS | LOCK MECHANISM | JOB EXECUTABLE/ NON-EXECUTABLE |
|---|---|---|---|---|---|---|
| 1 | JOB A | 5 | OFF | UNRESERVED | NOT INCLUDED | YES |
| 2 | JOB B | 1 | ON | RESERVED | NOT INCLUDED | YES |
| | | | | | | |
| | | | | | | |
| | | | | | | |

FIG. 31A

| JOB EXECUTION ORDER | JOB NAME | NUMBER | CONFIRMATION PRINT MODE | RESERVATION STATUS | LOCK MECHANISM | JOB EXECUTABLE/ NON-EXECUTABLE |
|---|---|---|---|---|---|---|
| 1 | JOB A | 5 | OFF | UNRESERVED | NOT INCLUDED | YES |
| 2 | JOB B | 1 | ON | RESERVATION CANCELLED | NOT INCLUDED | NO |
| 3 | JOB C | 4 | OFF | RESERVATION CANCELLED | INCLUDED | NO |
| | | | | | | |
| | | | | | | |
| | | | | | | |

FIG. 31B

| JOB EXECUTION ORDER | JOB NAME | NUMBER | CONFIRMATION PRINT MODE | RESERVATION STATUS | LOCK MECHANISM | JOB EXECUTABLE/ NON-EXECUTABLE |
|---|---|---|---|---|---|---|
| 1 | JOB B | 1 | ON | RESERVATION CANCELLED | NOT INCLUDED | NO |
| 2 | JOB C | 4 | OFF | RESERVATION CANCELLED | INCLUDED | NO |
| | | | | | | |
| | | | | | | |
| | | | | | | |
| | | | | | | |

FIG. 31C

| JOB EXECUTION ORDER | JOB NAME | NUMBER | CONFIRMATION PRINT MODE | RESERVATION STATUS | LOCK MECHANISM | JOB EXECUTABLE/ NON-EXECUTABLE |
|---|---|---|---|---|---|---|
| 1 | JOB C | 4 | OFF | RESERVATION CANCELLED | INCLUDED | NO |
| | | | | | | |
| | | | | | | |
| | | | | | | |
| | | | | | | |
| | | | | | | |

FIG. 33

SHEET FEEDER 1 WAS OPENED AND CLOSED AFTER RESERVATION
PLEASE SELECT SHEET FEEDER TO BE RESERVED

■ SHEETS REQUIRED FOR PRINT
▲ A4
    PLAIN SHEET1(64~81g/m²)

■ INFORMATION ON CURRENTLY SELECTED SHEET
▲

| CANCEL | CLOSE | OK |

PRINTER   JOB B JOB COMMENT: PRESENTATION DOCUMENT FOR DESIGN DIVISION

IMAGE FORMING APPARATUS EQUIPPED WITH A PLURALITY OF SHEET FEEDERS, CONTROL METHOD THEREFOR, AND PROGRAM

BACKGROUND OF THE INVENTION

Field of the Invention

The present invention relates to an image forming apparatus with a plurality of sheet feeders, a control method therefor, and a program.

Description of the Related Art

There is known an MFP which is an image forming apparatus equipped with a plurality of sheet feeders such as a manual feed tray and a sheet feeding cassette. Sheets of different sizes are stored in the respective sheet feeders of the MFP, and when a print job is submitted to the MFP, the MFP identifies a sheet feeder in which sheets of a size designated for the print job from among the plurality of sheet feeders and performs printing using the sheets in the identified sheet feeder. A user of the MFP is also allowed to designate a sheet feeder for use in the submitted print job (see Japanese Laid-Open Patent Publication (Kokai) No. 2005-104614, for example). For example, the user places, in a predetermined sheet feeder, sheets of a size different from that of plain sheets and then designates the predetermined sheet feeder. Thus, the user is able to obtain printed matter with desired-type sheets.

However, in environments such as an office where a plurality of users uses the MFP, a problem arises when one user places sheets of a desired type in a predetermined sheet feeder and is waiting for execution of a print job he or she has submitted, because the sheets in the predetermined sheet feeder may be used for another job submitted by another user.

SUMMARY OF THE INVENTION

The present invention provides an image forming apparatus and a control method therefor which are capable of preventing sheets in a sheet feeder which has been designated for a print job by a user from being used for print jobs other than the print job, as well as a program.

Accordingly, the present invention provides an image forming apparatus equipped with a plurality of sheet feeders, comprising a print job executing unit configured to execute a submitted print job; a selecting unit configured to prompt a user to select a sheet feeder for use in the print job from among the plurality of sheet feeders; and a control unit configured to provide control such that the selected sheet feeder cannot be used for another print job other than the print job.

According to the present invention, sheets in a sheet feeder which is designated for a print job by a user is prevented from being used for print jobs other than the print job.

Further features of the present invention will become apparent from the following description of exemplary embodiments with reference to the attached drawings.

BRIEF DESCRIPTION OF THE DRAWINGS

FIG. 8 is a view showing an example of a selection screen which is displayed on the operating unit in FIG. 2.

FIGS. 9A to 9C are views showing examples of a management table which is managed by the MFP in FIG. 1.

FIGS. 11A and 11B are views showing examples of a notification screen which is displayed on the operating unit in FIG. 2.

FIGS. 13A and 13B are views showing examples of a management table which is managed by the MFP in FIG. 1.

FIG. 17 is a view showing an example of a management table that is managed by the MFP in FIG. 1.

Figure 20:
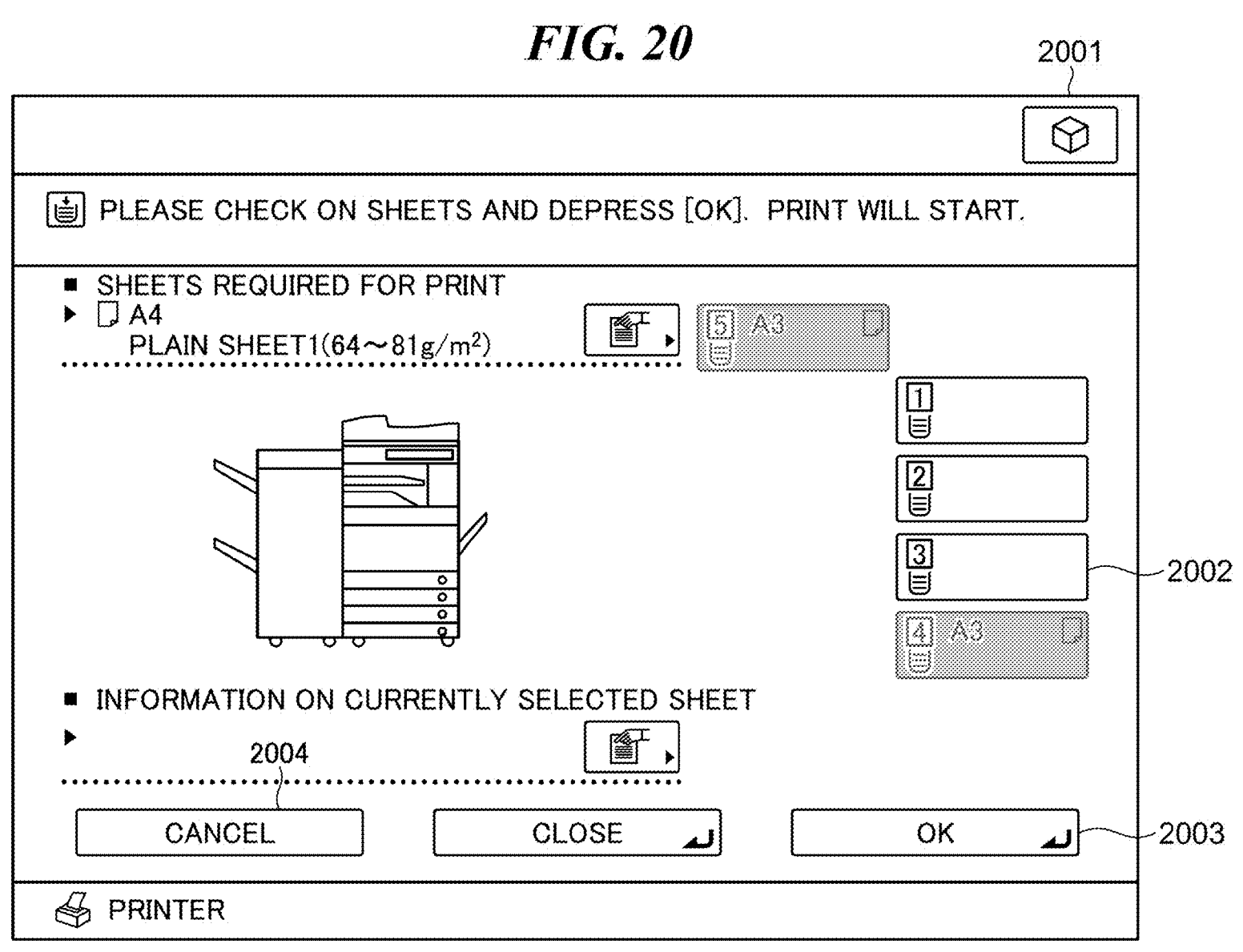

FIG. 20 is a view showing an example of a pause screen which is displayed on the operating unit in FIG. 2.

FIGS. 23A and 23B are views showing examples of a management table which is managed by the MFP in FIG. 1.

FIG. 24 is a view showing an example of a selection screen which is displayed on the operating unit in FIG. 2.

FIG. 28 is a view showing an example of a management table which is managed by the MFP in FIG. 1.

FIGS. 31A to 31C are views showing examples of a management table which is managed by the MFP in FIG. 1.

FIG. 33 is a view showing an example of a pause screen which is displayed on the operating unit in FIG. 2.

DESCRIPTION OF THE EMBODIMENTS

The present invention will now be described in detail below with reference to the accompanying drawings showing embodiments thereof.

First, a description will be given of a first embodiment of the present invention.

Figure 1:
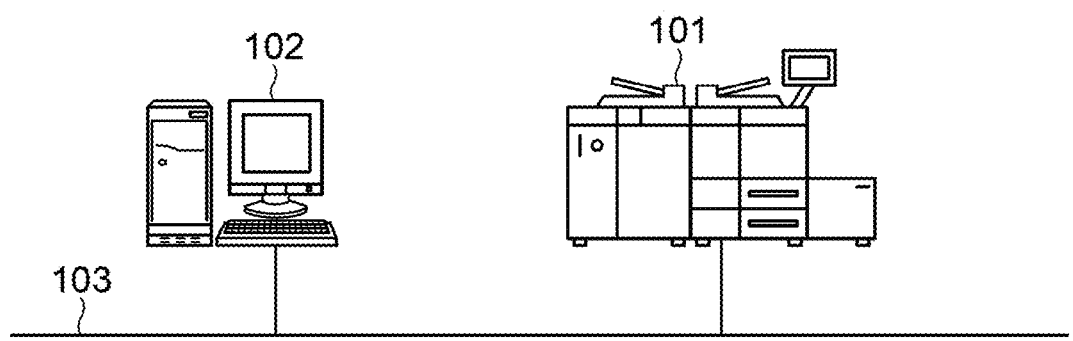
FIG. 1 is a network view schematically showing an arrangement of a communication system including an MFP according to a first embodiment of the present invention.

FIG. 1 is a network view schematically showing an arrangement of a communication system 100 including an MFP 101 according to the embodiments of the present invention.

Referring to FIG. 1, the communication system 100 has an MFP 101 which is an image forming apparatus, and a PC 102 which is an information processing apparatus. The MFP 101 and the PC 102 are connected to each other via a network 103.

The MFP 101 has a copying function, a printing function, a scanning function, and a communicating function. Upon receiving an instruction to submit a print job from a user, the PC 102 generates print data for executing the print job and sends the generated print data to the MFP 101. The print data is comprised of PDL (page-description language) code data, a job ticket, and a command interpretable by the MFP 101 and includes image data, print setting information, and so forth required to execute the print job. For example, a destination of submission indicating one of a print queue and a hold queue is set as the print setting information. The print job submitted to the print queue is immediately executed, whereas the print job submitted to the hold queue is not immediately executed but is reserved and then executed when the MFP 101 receives a print starting instruction given by the user.

Figure 2:
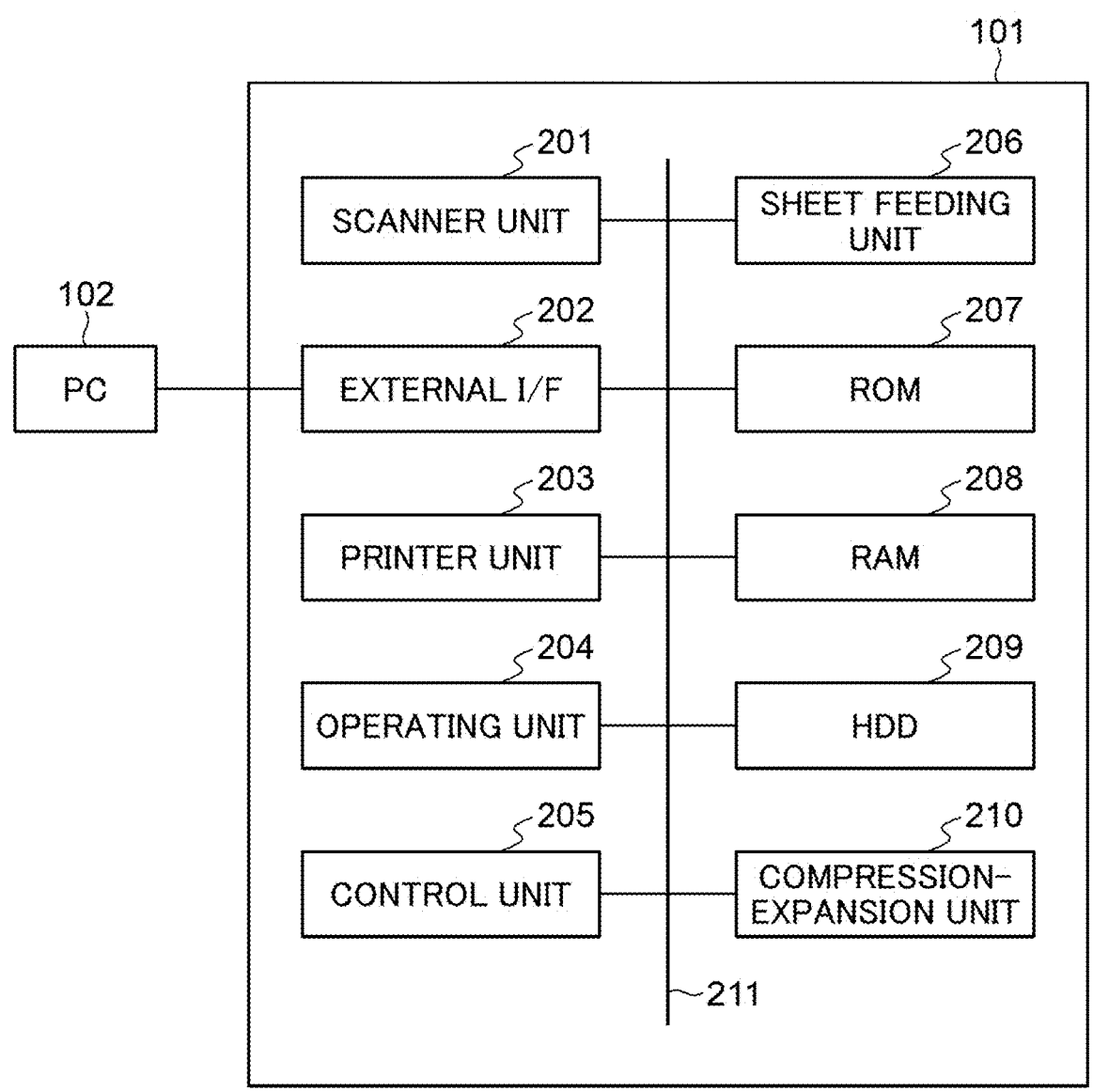
FIG. 2 is a block diagram schematically showing an arrangement of the MFP in FIG. 1.

FIG. 2 is a block diagram schematically showing a functional arrangement of the MFP 101 in FIG. 1.

Referring to FIG. 2, the MFP 101 has a scanner unit 201, an external I/F 202, a printer unit 203, an operating unit 204, a control unit 205, a sheet feeding unit 206, a ROM 207, a RAM 208, an HDD 209, and a compression-expansion unit 210. The scanner unit 201, the external I/F 202, the printer unit 203, the operating unit 204, the control unit 205, the sheet feeding unit 206, the ROM 207, the RAM 208, the HDD 209, and the compression-expansion unit 210 are connected to one another via a system bus 211.

Figure 3:
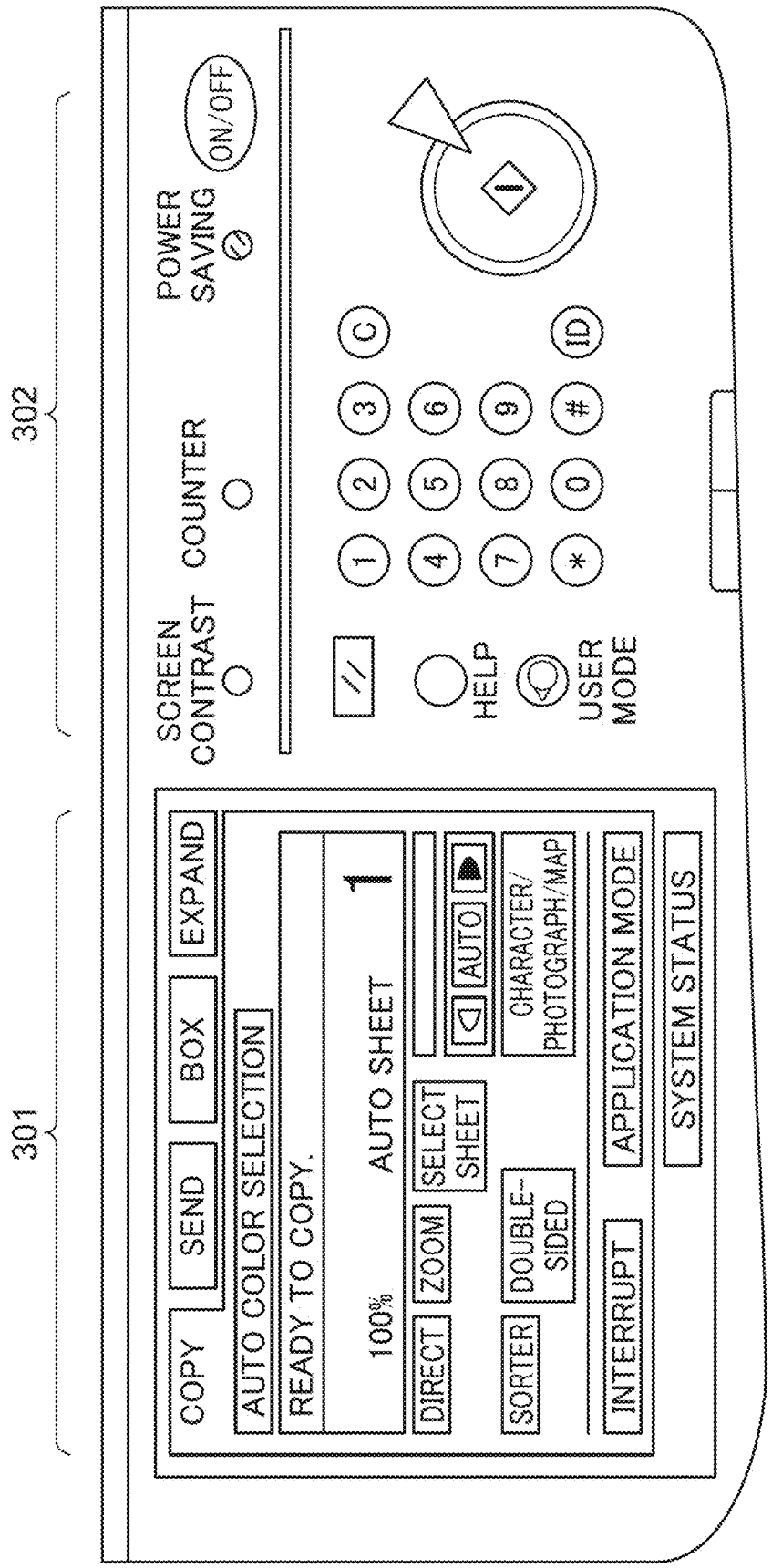
FIG. 3 is a view showing an external view of an operating unit in FIG. 2.

The scanner unit 201 obtains image information by reading a placed original, converts the image information into image data, and transfers the image data to the printer unit 203, the HDD 209, or the like. The external I/F 202 sends and receives data to and from a communication apparatus such as the PC 102 connected to the network 103. The printer unit 203 performs printing based on the print data received from the PC 102 or the image data transferred from the scanner unit 201. The operating unit 204 is a user interface of the MFP 101 and has a touch panel unit 301 and a hardware input unit 302 as shown in FIG. 3. An operating screen is displayed on the touch panel unit 301, and the user uses the operating screen to give instructions to submit a job and change settings on the MFP 101. The control unit 205 integratedly controls the overall operation of the MFP 101. For example, the control unit 205 executes programs stored in the ROM 207 to implement processes of software modules 500 in FIG. 5.

The sheet feeding unit 206 has a plurality of sheet feeders such as sheet feeding cassettes 410 and 411, sheet feeding decks 412 and 413, and a manual feed tray 414 in FIG. 4A, to be described later. The sheet feeding unit 206 conveys sheets one by one from a sheet feeder designated by the control unit 205 from among the plurality of sheet feeders to the printer unit 203. The ROM 207 stores programs to be executed by the control unit 205, setting information on the MFP 101, and so forth. The RAM 208 is used as a work area for the control unit 205 and as a temporary storage area for each piece of data. The HDD 209, which is a mass-storage device, is comprised of a hard disk (not shown), a drive unit that reads and writes data from and into the hard disk, and so forth. The HDD 209 stores image data generated by the scanner unit 201. The HDD 209 is also used as a spooler to store print data received from the PC 102. The compression-expansion unit 210 subjects image data stored in the RAM 208 and the HDD 209 to a compression process and an expansion process using a compression method such as JBIG and JPEG.

Figure 4A:
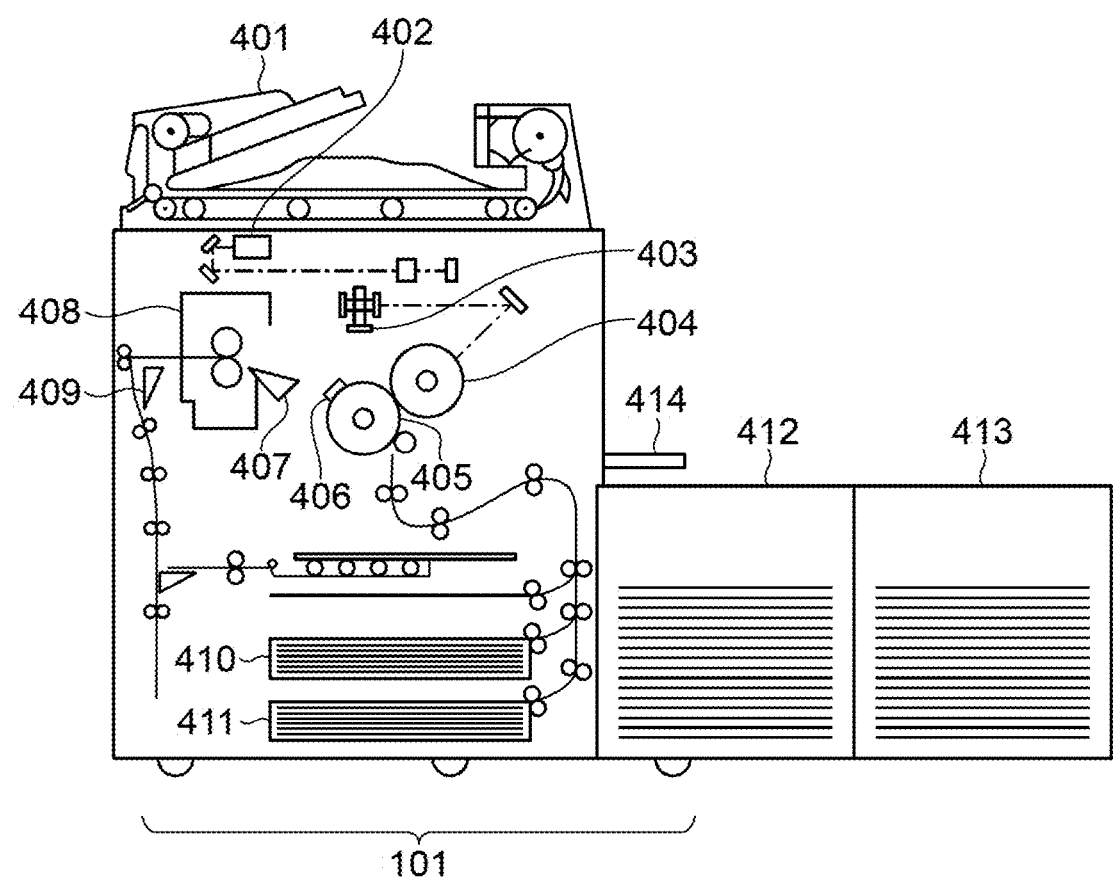
FIGS. 4A and 4B are views useful in explaining a hardware arrangement of the MFP in FIG. 1.
Figure 4B:
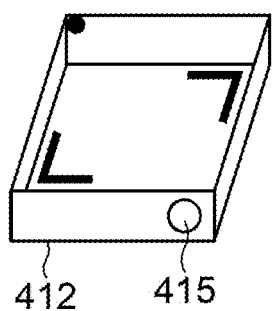

FIGS. 4A and 4B are views useful in explaining a hardware arrangement of the MFP 101 in FIG. 1. FIG. 4A is a cross-sectional view of the MFP 101, and FIG. 4B is a schematic view of the sheet feeding deck 412.

Referring to FIG. 4A, in the MFP 101, an automatic original conveyer (ADF) 401 conveys a batch of originals, which is placed on a stacking surface of an original tray (not shown), onto an original platen glass in page order from a first page. A scanner 402 reads an image off an original on the original platen glass and converts the read image into image data using a CCD. After that, a rotary polygon mirror 403 irradiates a photosensitive drum 404 with laser light, which is obtained by modulating the image data, via reflective mirrors. As a result, a latent image is formed on the photosensitive drum 404. The latent image on the photosensitive drum 404 is developed by toner and transferred as a toner image onto a sheet attached onto a transfer drum 405. This sequential image forming process is carried out for yellow (Y), magenta (M), cyan (C), and black (K) colors in this order to form a full-color image on the sheet. The sheet on the transfer drum 405 on which the color image formed thereon has been formed is separated from the transfer from 405 by a separation claw 406 and conveyed to a fixing device 408 by a pre-fixing conveyer 407. The fixing device 408 melts toner on the sheet, onto which the toner image has been transferred, with heat and pressure to fix the toner image onto the sheet. A sheet-discharging flapper 409 is configured to be able to swing about a swinging axis (not shown) to define a direction in which the sheet is conveyed.

In the MFP 101, sheets for use in printing are stored in the sheet feeding unit 206. The sheet feeding unit 206 has the plurality of sheet feeders such as the sheet feeding cassettes 410 and 411, the sheet feeding decks 412 and 413, and the manual feed tray 414. In the sheet feeding unit 206, sheets that vary in size, thickness, and so forth are stored in a distinguishable manner in the sheet feeding cassettes 410 and 411, the sheet feeding decks 412 and 413, and the manual feed tray 414. In the sheet feeding unit 206, OHP sheets and the like are stored in the manual feed tray 414. It should be noted that in the present embodiment, the sheet feeding cassettes 410 and 411 have the same arrangement, which is described below by taking the sheet feeding cassette 410 as an example. The sheet feeding decks 412 and 413 also have the same arrangement, which is described below by taking the sheet feeding deck 412 as an example.

The sheet feeding cassette 410 is able to store about 500 sheets and has an non-electronic locking type open button and an open-close sensor, which are not shown. When the user depresses the open button, the sheet feeding cassette 410 opens. This enables the user to replenish the sheet feeding cassette 410 with sheets or replace sheets in the sheet feeding cassette 410 with another type of sheets. When the open-close sensor detects that the sheet feeding cassette 410 has opened, the control unit 205 is notified to that effect.

The sheet feeding deck 412 is able to store about 5,000 sheets and has an open button 415 in FIG. 4B. The open button 415 is an electronic locking type open button. In the sheet feeding deck 412, only when the user depresses the open button 415, and the sheet feeding deck 412 is unlocked, the sheet feeding deck 412 opens. When depression of the open-close button 415 is detected, the control unit 205 is notified to that effect.

The manual feed tray 414 is equipped with a sheet detecting mechanism (not shown). The sheet detecting mechanism detects placement of sheets on the manual feed tray 414 or removal of sheets from the manual feed tray 414, and the control unit 205 is notified to that effect.

Figure 5:
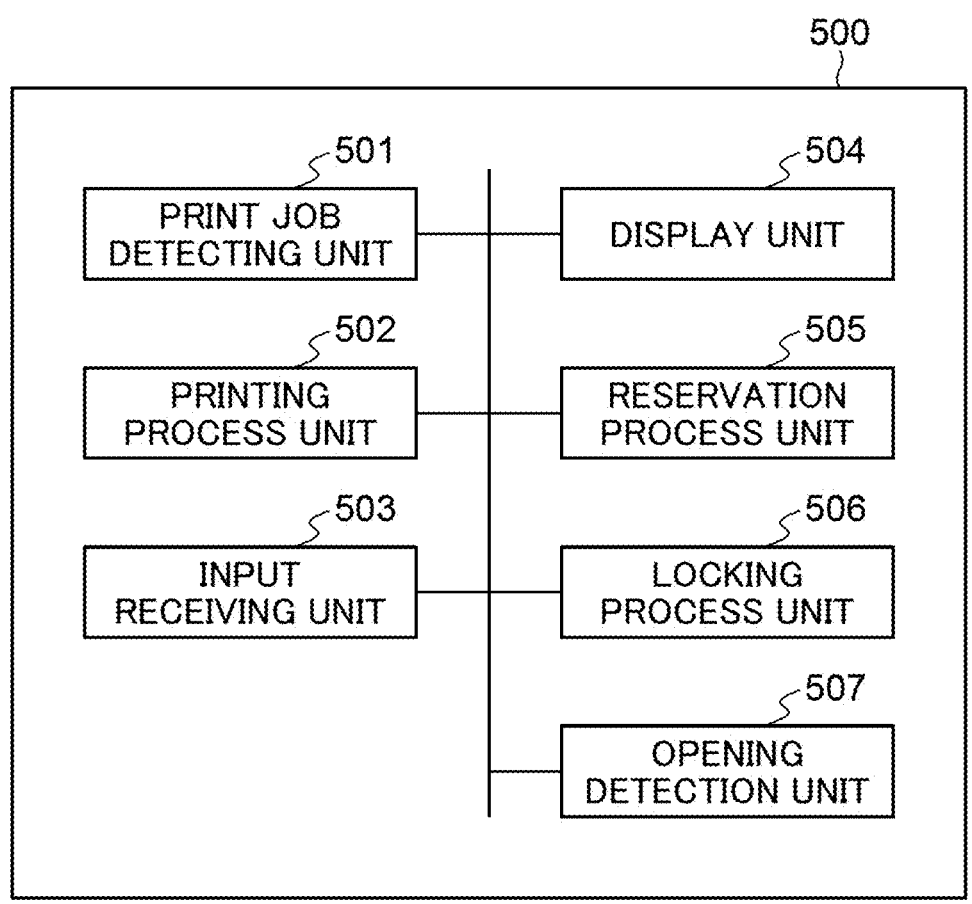
FIG. 5 is a block diagram schematically showing an arrangement of software modules of the MFP in FIG. 1.

FIG. 5 is a block diagram schematically showing an arrangement of the software modules 500 of the MFP in FIG. 1.

Referring to FIG. 5, the software modules 500 have a print job detecting unit 501, a printing process unit 502, an input receiving unit 503, a display unit 504, a reservation process unit 505, a locking process unit 506, and an opening detecting unite 507. Processes by the software modules 500 are implemented by the control unit 205 executing programs stored in the ROM 207 and the like.

Upon receiving print data from the PC 102, the print job detecting unit 501 stores the print data in the RAM 208. Also, based on a submission destination designated in the print data, the print job detecting unit 501 submits a print job corresponding to the print data to either of a print queue and a hold queue. The printing process unit 502 performs printing on sheets by controlling the printer unit 203 and the sheet feeding unit 206. The input receiving unit 503 outputs user input information, which is received by the operating unit 204, to the control unit 205. The display unit 504 controls display on the operating unit 204. The reservation process unit 505 controls reservation of the sheet feeders and cancellation of reservations. In the present embodiment, before a print job is executed, it is possible to reserve a sheet feeder for use in the print job, and the reserved sheet feeder cannot be used for another print job until the execution of the print job is completed. The locking process unit 506 provides control to lock the sheet feeding decks 412 and 413 equipped with the electronic locking type open button 415 so that operation of the open button 415 cannot be accepted and also unlocks the sheet feeding decks 412 and 413. Upon detecting opening operations of the respective sheet feeders of the sheet feeding unit 206, the opening detecting unit 507 notifies the control unit 205 to that effect.

Next, referring to FIGS. 6 to 20, a description will be given of a process, carried out by the communication system 100, from issuance of an instruction to submit print jobs to the hold queue to execution of the print jobs.

Figure 6:
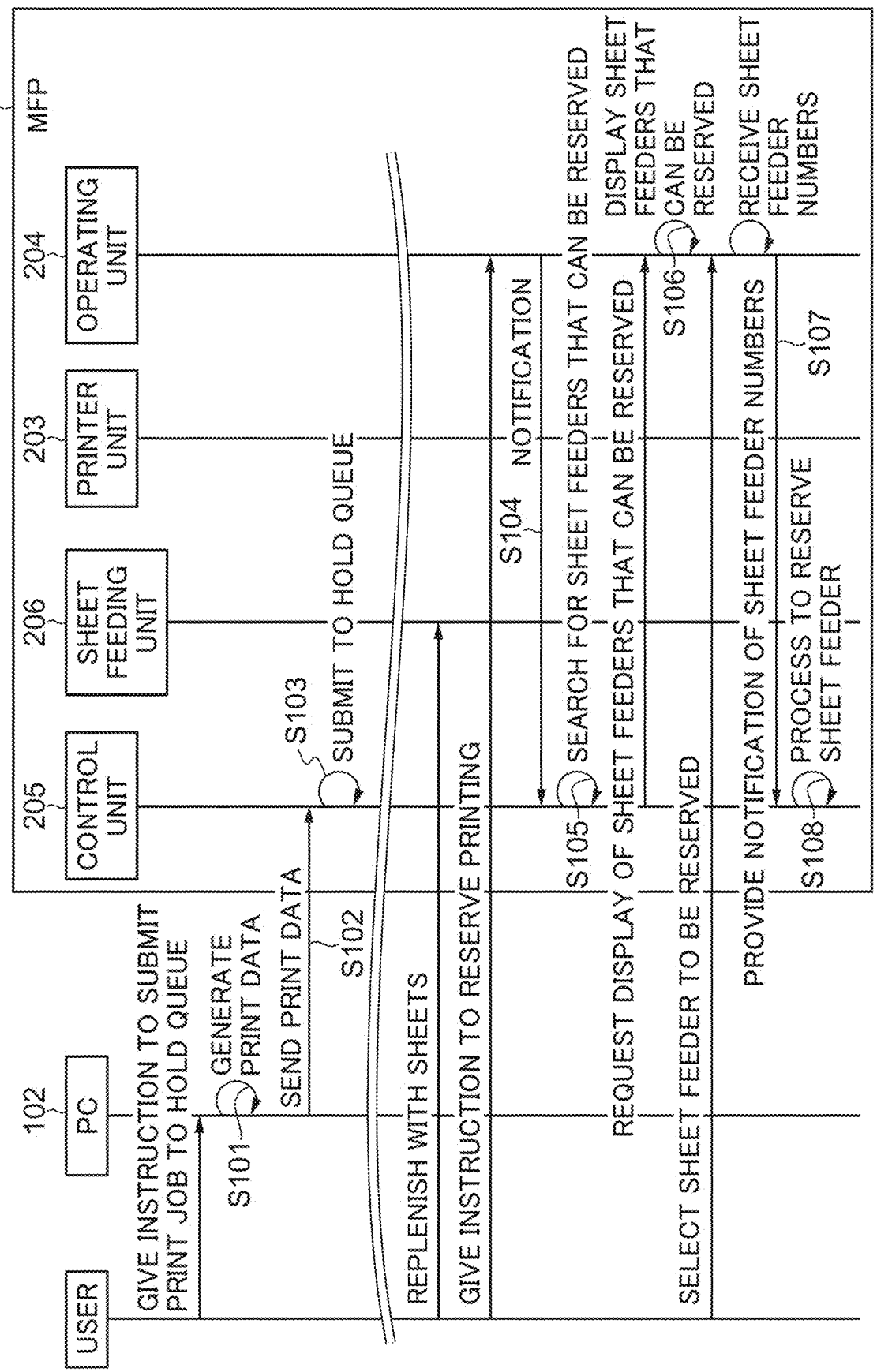
FIG. 6 is a sequence diagram showing the procedure of a process, carried out by the MFP in FIG. 1, from issuance of an instruction to submit a print job to a hold queue in a PC appearing in FIG. 1 to reservation of a sheet feeder for use in the print job.

FIG. 6 is a sequence diagram showing the procedure of a process, carried out by the MFP 101, from issuance of an instruction to submit print jobs to the hold queue in the PC 102 in FIG. 1 to reservation of a sheet feeder for use in the print job.

Referring to FIG. 6, when the user operates the PC 102 to issue an instruction to submit print jobs to the hold queue, the PC 102 generates print data in which the hold queue is set as a submission destination (step S101). Then, the PC 102 sends the generated print data to the MFP 101 (step S102). The MFP 101 that has received the print data submits the print jobs corresponding to the print data to the hold queue (step S103). After that, when the user who has moved from the PC 102 to the MFP 101 replenishes the sheet feeding unit 206 with sheets and also operates the operating unit 204 to issue an instruction to reserve printing of the print jobs submitted to the hold queue, the operating unit 204 notifies the control unit 205 that the instruction to reserve printing has been received (step S104). The operating unit 204 also displays list information on the print jobs submitted to the hold queue and notifies the control unit 205 of print jobs selected by the user from the list information (hereafter referred to as "the selected print jobs"). The control unit 205 notified of the selected print job searches for sheet feeders that can be reserved (step S105) and requests the operating unit 204 to display the sheet feeders that can be reserved. The operating unit 204 displays the sheet feeders that can be reserved as candidates for sheet feeders for use in the selected print jobs (step S106). The control unit 205 is then notified of sheet feeder numbers indicating the sheet feeders selected by the user from the sheet feeders that can be reserved which are displayed on the operating unit 204 (step S107). In the present embodiment, a sheet feeder number "1" indicates the sheet feeding cassette 410, a sheet feeder number "2" indicates the sheet feeding cassette 411, and a sheet feeder number "3" indicates the sheet feeding deck 412. A sheet feeder number "4" indicates the sheet feeding deck 413, and a sheet feeder number "5" indicates the manual feed tray 414. The control unit 205 that has obtained the sheet feeder numbers from the operating, unit 204 submits the selected print jobs to the print queue and also carries out a process to reserve the sheet feeders indicated by the obtained sheet feeder numbers (step S108).

Figure 7:
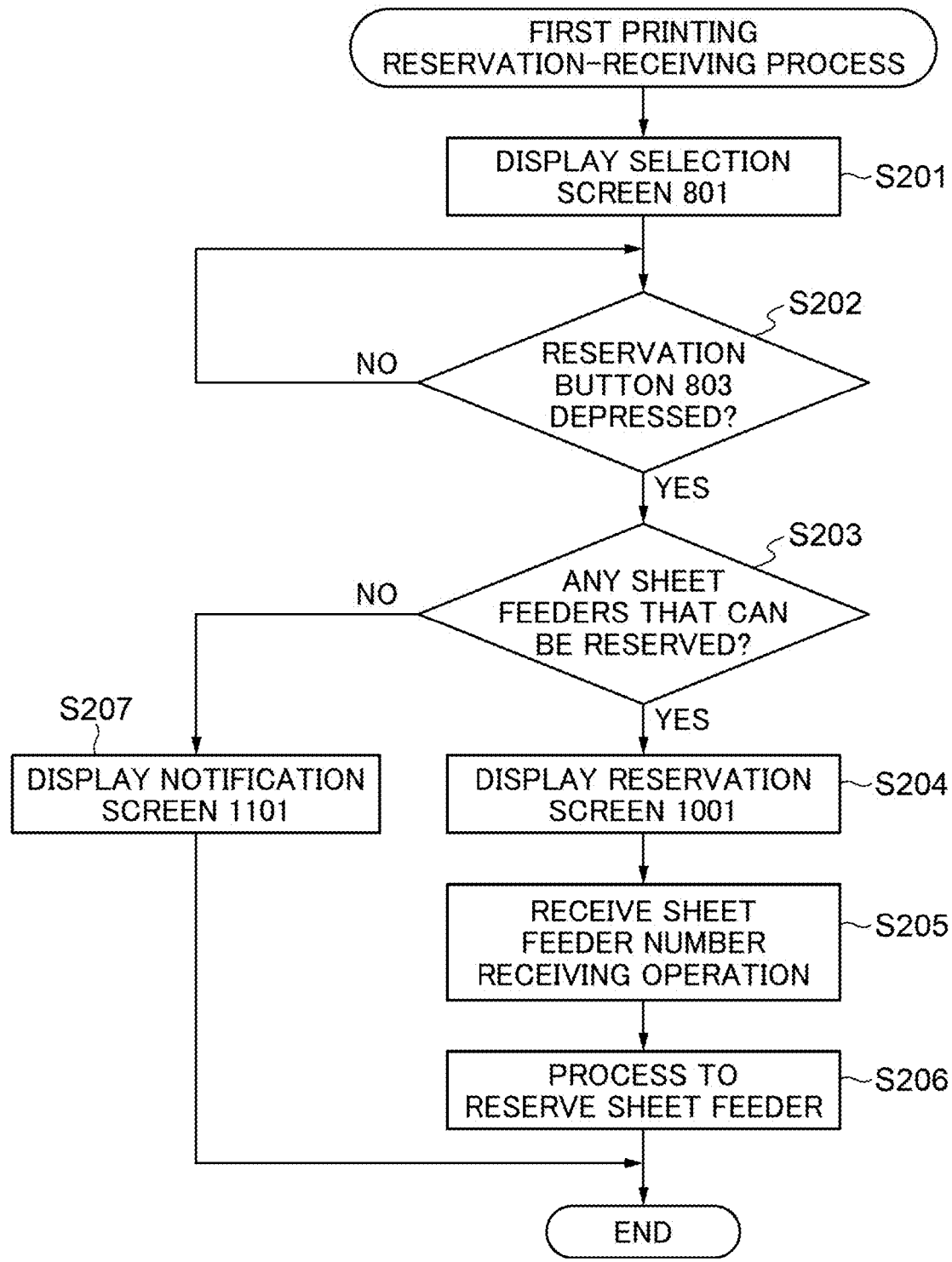
FIG. 7 is a flowchart showing the procedure of a first print reservation-receiving process which is carried out by the MFP in FIG. 1.

FIG. 7 is a flowchart showing the procedure of a first print reservation-receiving process that is carried out by the MFP 101 in FIG. 1.

The process in FIG. 7 is implemented by the control unit 205 executing programs stored in the ROM 207 or the like and carried out when the operating unit 204 has received an instruction to reserve printing of a print job submitted to the hold queue.

Referring to FIG. 7, first, the control unit 205 obtains list information on print jobs submitted to the hold queue. Based on the obtained list information, the control unit 205 displays a selection screen 801 in FIG. 8 on the operating unit 204 (step S201). The selection screen 801 is an operating screen for seeing print jobs submitted to the hold queue. The print jobs submitted to the hold queue are displayed in a list 802. When, the user depresses a reservation button 803 in a state where, for example, a print job C is selected (YES in step S202), the control unit 205 searches for sheet feeders that can be reserved (refer to the step S105 in FIG. 6, for example). Specifically, based on a management table 901 in FIG. 9A, the control unit 205 determines whether or not there are sheet feeders that can be reserved (step S203).

The management table 901 manages information on execution of print jobs and is comprised of the following setting items: job execution order 902, job name 903, number 904, reservation status 905, lock mechanism 906, and job executable/non-executable 907. In the management table 901, information on execution of print jobs submitted to the print queue, that is, print jobs for which immediate execution has been ordered by the user is registered. In the present embodiment, print jobs for which the print queue is set as a submission destination and print jobs that have been submitted to the hold queue and for which the operating unit 204 has received a printing start instruction from the user via the operating unit 204 are submitted to the print queue. The job execution order 902 represents an execution order of the print jobs. In the present embodiment, the order in which the print jobs are submitted to the print queue is directly set as the execution order.

The job name 903 means names of the print jobs submitted to the print queue. Sheet feeder numbers indicating sheet feeders to be used by the registered print jobs are set in the number 904. Information about whether or not the sheet feeders indicated by the number 904 have already been reserved is set in the reservation status 905. Information about whether or not the sheet feeders indicated by the number 904 are equipped with lock mechanisms such as the electronic locking type open button 415 is set in the lock mechanism 906.

Information about whether or not the registered print jobs are ready to be executed is set in the job executable/non-executable 907. In the job executable/non-executable 907, "YES" which means that the registered print jobs are ready to be executed is usually set, and "NO" which means that the registered print jobs are not ready to be executed is set for print jobs for which reservations of the sheet feeders have been canceled. In the step S203, for example, when sheet feeder numbers of only some sheet feeders of the sheet feeding unit 206 are registered in the management table 901 as shown in FIG. 9A, the control unit 205 determines that there are sheet feeders that can be reserved. On the other hand, when sheet feeder numbers of all the sheet feeders of the sheet feeding unit 206 are registered in the management table 901 as shown in FIG. 9C, the control unit 205 determines that there is no sheet feeder that can be reserved.

Figure 10:
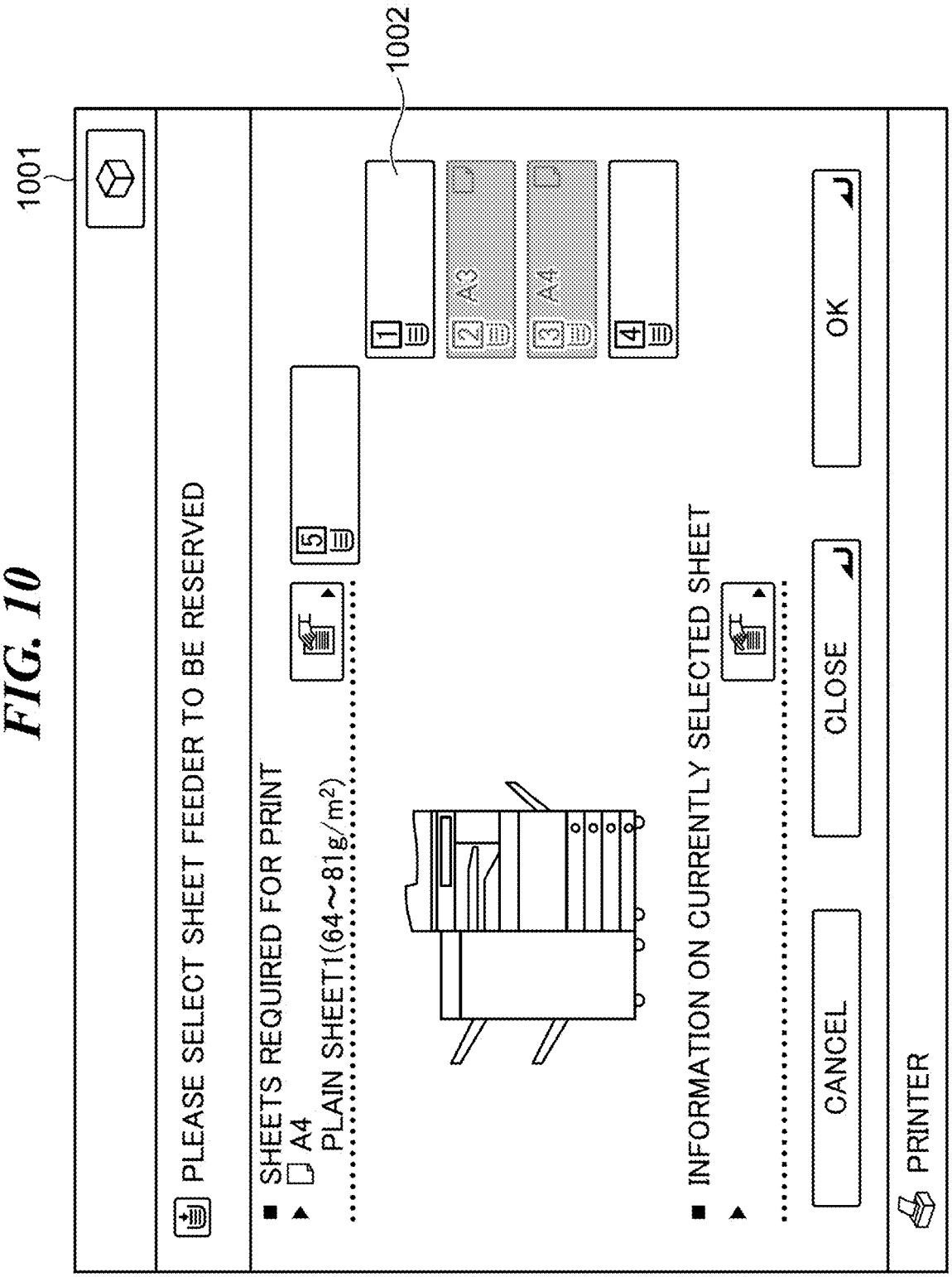
FIG. 10 is a view showing an example of a reservation screen which is displayed on the operating unit in FIG. 2.

As a result of the determination in the step S203, when there are sheet feeders that can be reserved, the control unit 205 displays, on the operating unit 204, a reservation screen 1001 in FIG. 10 for reserving a sheet feeder that is to be used for the selected print job C (step S204) (refer to the step S106 in FIG. 6, for example). On the reservation screen 1001, only sheet feeders that can be reserved are displayed in a selectable manner from among the sheet feeders of the sheet feeding unit 206. For example, when the sheet feeder numbers "2" and "3" are registered in the management table 901 as shown in FIG. 9A, the sheet feeder numbers "1", "4", and "5" are displayed in a selectable manner on the reservation screen 1001. Upon receiving a sheet feeder number selecting operation by the user via the reservation screen 1001 (step S205), the control unit 2005 submits the selected print job to the print queue on the selection screen 801.

Then, the control unit 205 carries out a process to reserve a sheet feeder with a sheet feeder number selected on the reservation screen 1001 (step S206). For example, when an operating button 1002 for the sheet feeder number "1" is selected on the reservation screen 1001, the control unit 205 carries out the process in the step S206 to reserve the sheet feeder for the print job C. In the process to reserve the sheet feeder for the print job C, the control unit 205 registers information on the print job C in the management table 901. Referring to a management table 908 in FIG. 9B, for example, as the information on the print job C, the sheet feeder number "4" is set in the number 904, "Reserved" is set in the reservation status 905, and "YES" is set in the job executable/non-executable. As a result, the sheet feeding deck 413 corresponding to the sheet feeder number "4" cannot be used for jobs other than the print job C until execution of the print job C is completed, followed by the present process being terminated.

As a result of the determination in the step S203, when there is no sheet feeder that can be reserved, the control unit 205 calculates predicted time periods that elapse before reservations of the sheet feeders are canceled (hereafter referred to as "the reservation cancellation-predicted time periods"). Here, an execution time period required for a fixing process in which the fixing device 408 fixes toner to a sheet varies depending on the basis weight of sheets, and as the basis weight increases, the execution time period increases. In the present embodiment, print speeds for respective types of sheets derived from the execution time periods for the fixing process are held in advance in the RAM 208, and based on the print speeds for types of sheets stored in the respective sheet feeders, printing time periods for print jobs using the respective sheet feeders are calculated. To calculate printing time periods for print jobs, the control unit 205 analyzes all of print jobs submitted to the print queue and obtains the number of copies and a type of sheets for each of the print jobs. The control unit 205 also obtains print speeds for the obtained types of sheets for the respective print jobs from the RAM 208. The control unit 205 calculates the printing time period for each of the print jobs by multiplying the print speed by the number of copies, and based on the calculated printing time period, the control unit 205 calculates the reservation cancellation-predicted time period for each of the sheet feeders. For example, referring to a management table 909 in FIG. 9C, assume that the number of copies in a print job A for which the job execution order 902 is "1" is 60, and the print speed for a type of sheets used for the print job A is 60 ppm (pages per minute). In this case, the printing time period required for the print job A is 60 (sheets)×(1/60) (minute/sheets)=1 (minute), and hence the reservation cancellation-predicted time period for the sheet feeding cassette 411 corresponding to the sheet feeder number "2" which is used for the print job A is 1 (minute).

Assume that the number of copies in a print job B which is executed subsequently to the print job A is 30, and the print speed for a type of sheets used for the print job B is 30 ppm. In this case, the printing time period required for the print job A is 30 (sheets)×(1/30) (minute/sheets)=1 (minute). The reservation cancellation-predicted time period for the sheet feeding cassette 412 corresponding to the sheet feeder number "3" which is used for the print job B is 2 (minutes) that is found by adding the printing time period of 1 (minute) for the print job A to the above calculation result, that is, 1 (minute). Similarly, the reservation cancellation-predicted time periods for the respective sheet feeders that are used for print jobs C, D, and E are calculated. Based on the calculation results, the control unit 205 displays a notification screen 1101 in FIG. 11A on the operating unit 204 (step S207). The notification screen 1101 includes a message saying that all the sheet feeders of the sheet feeding unit 206 have been reserved, and the reservation cancellation-predicted time periods for the respective sheet feeders. It should be noted that in the present embodiment, a print job for which "NO" is set in the job executable/non-executable 907 of the management table 901 is not executed unless a print starting instruction given by the user is received by the operating unit 204. It is therefore impossible to calculate the reservation cancellation-predicted time periods for the sheet feeder for use in the above print job and the sheet feeders for use in print jobs to be executed after the above print job. For example, assuming that the job executable/non-executable 907 for the print job D is "NO" in the management table 909, the control unit 205 cannot calculate the reservation cancellation-predicted time periods for the sheet feeder 410 corresponding to the sheet feeder number "1" which is used for the print job D and the manual feed tray 414 corresponding to the sheet feeder number "5" which is used for the print job E executed subsequently to the print job D. In such a case, the control unit 205 may display a notification screen 1102 in FIG. 11B on the operating unit 204 in the step S207. After that, the control unit 205 ends the present process.

Figure 12:
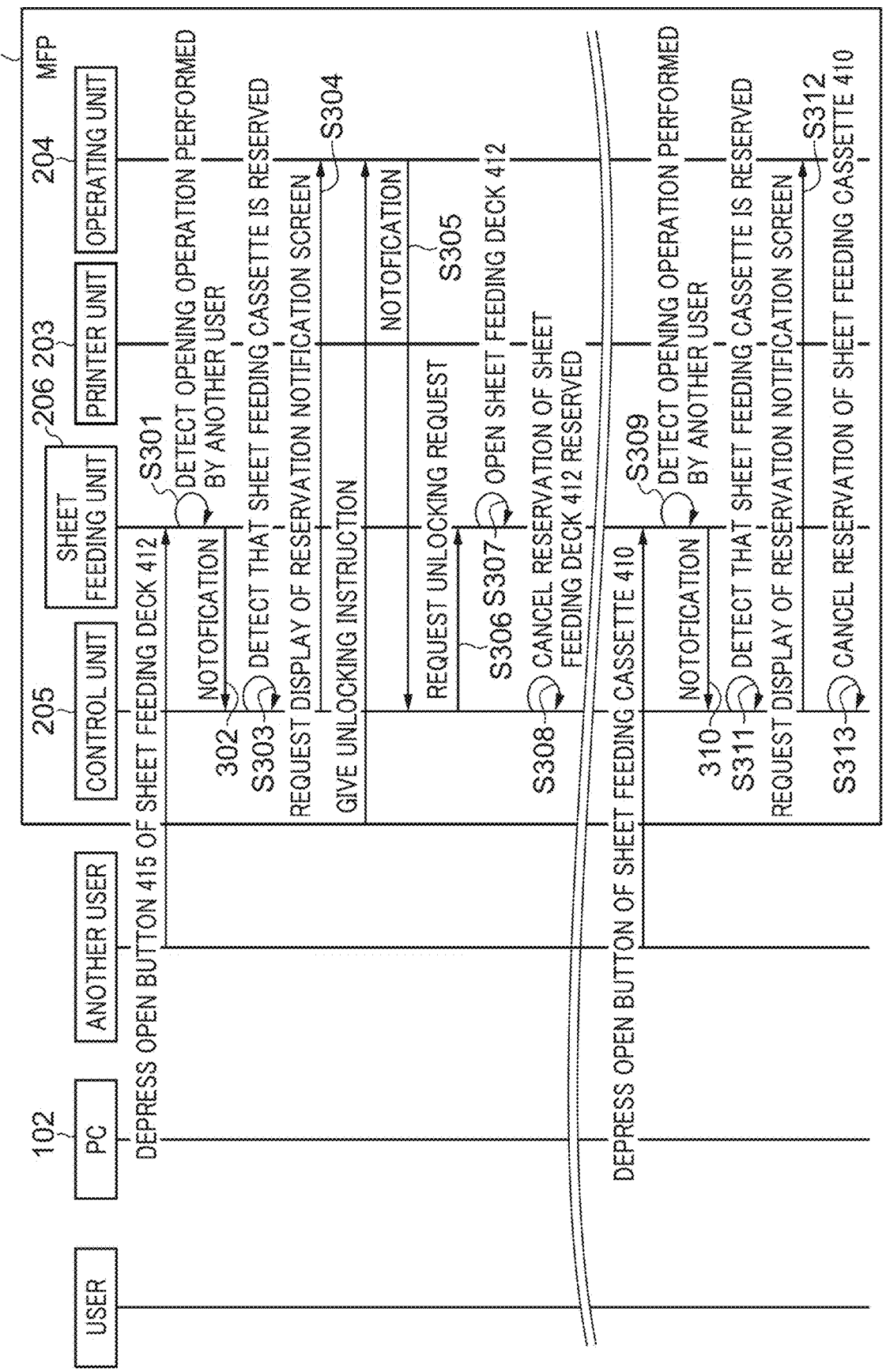
FIG. 12 is a sequence diagram showing the procedure of a process which is carried out when the MFP in FIG. 1 has received an operation to open a reserved sheet feeder.

FIG. 12 is a sequence diagram showing the procedure of a process that is carried out when the MFP 101 in FIG. 1 has received an operation to open a reserved sheet feeder.

The process in FIG. 12 is carried out after the process in FIG. 7 is completed. In the process in FIG. 12, it is assumed that, for example, the sheet feeding deck 412 corresponding to the sheet feeder number "3" has been reserved as a sheet feeder for the print job B, and the sheet feeding cassette 410 corresponding to the sheet feeder number "1" has been reserved as a sheet feeder for the print job D. In this case, the sheet feeding deck 412 equipped with the electronic locking type open button 415 is locked, and only the user who issued the instruction to submit the print job B is allowed to open the sheet feeding deck 412. Whether or not a user is the same person as a user who issued the instruction to submit the print job B is determined based on, for example, a user ID entered when he or she logged into the MFP 101.

Referring to FIG. 12, when another user other than the user who issued the instruction to submit the print job B depresses the open button 415 for the sheet feeding deck 412 corresponding to the sheet feeder number "3", the sheet feeding unit 206 detects an opening operation performed on the sheet feeding deck 412 by the another user (step S301). The sheet feeding unit 206 does not open the sheet feeding deck 412 and notifies the control unit 205 that the opening operation performed on the sheet feeding deck 412 by the another user (step S302). When the control unit 205 that has received the notification detects that the sheet feeding deck 412 has already been reserved (step S303), the control unit 205 requests the operating unit 204 to display a reservation notification screen (step S304). The operating unit 204 that has received the display request displays the reservation notification screen indicating that the sheet feeding deck 412 has already been reserved. After that, upon receiving an instruction to unlock the sheet feeding deck 412 from the another user, the operating unit 204 notifies the control unit 205 that the instruction to unlock the sheet feeding deck 412 has been issued (step S305). The control unit 205 that has received the notification requests the sheet feeding unit 206 to unlock the sheet feeding deck 412 (step S306). The sheet feeding unit 206 that has received the unlocking request unlocks the sheet feeding deck 412 and opens the sheet feeding deck 412 (step S307). The control unit 205 then cancels the reservation of the sheet feeding deck 412 (step S308). Specifically, the control unit 205 sets the reservation status 905 for the print job B to "Reservation Canceled" and sets the job executable/non-executable 907 for the print job B to "NO" as in a management table 1301 in FIG. 13A.

When another user other than a user who issued an instruction to submit the print job D depresses an open button (not shown) for the sheet feeding cassette 410 corresponding to the sheet feeder number "1", the sheet feeding unit 206 detects an opening operation performed on the sheet feeding cassette 410 by the another user (step S309). The sheet feeding unit 206 opens the sheet feeding cassette 410 and notifies the control unit 205 that the opening operation performed on the sheet feeding cassette 410 by the another user has been detected (step S310). When the control unit 205 that has received the notification detects that the sheet feeding cassette 410 has already been reserved (step S311), the control unit 205 requests the operating unit 204 to display a reservation notification screen (step S312). The operating unit 205 that has received the display request displays the reservation notification screen indicating that the sheet feeding cassette 410 has already been reserved. The control unit 204 also cancels the reservation of the sheet feeding cassette 410 (step S313). Specifically, the control unit 205 sets the reservation status 905 for the print job D to "Reservation Canceled" and sets the job executable/non-executable 907 for the print job D to "NO" as in a management table 1302 in FIG. 13B.

Figure 14:
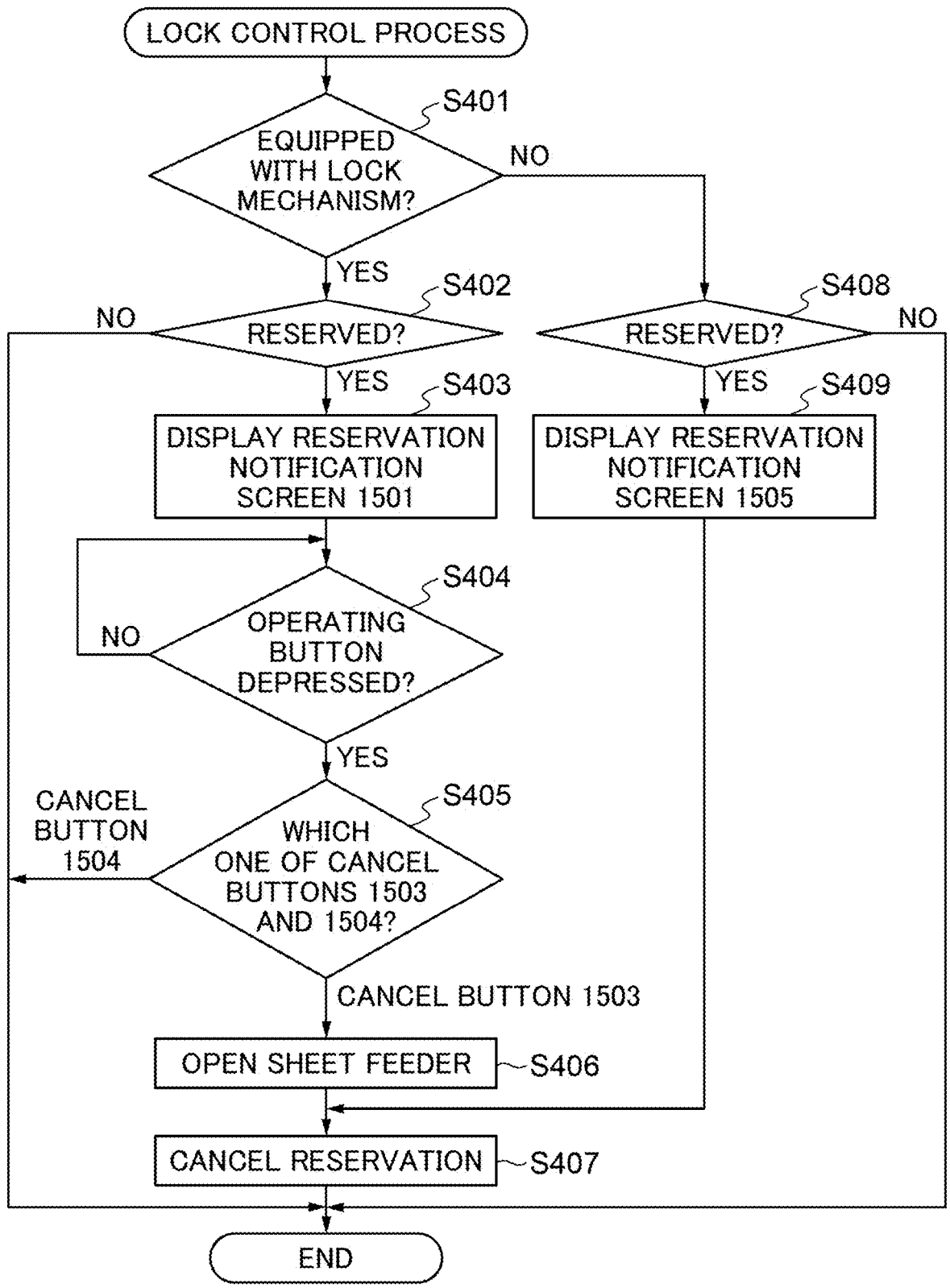
FIG. 14 is a flowchart showing the procedure of a lock control process which is carried out by the MFP in FIG. 1.

FIG. 14 is a flowchart showing the procedure of a lock control process that is carried out by the MFP 101 in FIG. 1.

The process in FIG. 14 is also implemented by the control unit 205 executing programs stored in the ROM 207 and the like. The process in FIG. 14 is carried out when a sheet feeder-related operation performed by another user such as an operation to open any of the sheet feeding cassettes 410 and 411 and the sheet feeding decks 412 and 413 or an operation to place recording members such as sheets on the manual feed tray 414 or remove the recording members from the manual feed tray 414 by the another user is detected.

Referring to FIG. 14, upon detecting a sheet feeder-related operation performed by the another user, the control unit 205 determines whether or not a sheet feeder for which a sheet feeder-related operation performed by the another user has been detected (hereafter referred to as "the operation-detected sheet feeder") is equipped with a lock mechanism (step S401). In the step S401, when, for example, the operation-detected sheet feeder is the sheet feeding deck 412 or 413 equipped with the electronic locking type open button 415, the control unit 205 determines that the operation-detected sheet feeder is equipped with the lock mechanism. On the other hand, when the operation-detected sheet feeder is any of the sheet feeding cassettes 410 and 411, and the manual feed tray 414 which are not equipped with the electronic locking type open button 415, the control unit 205 determines that the operation-detected sheet feeder is not equipped with the lock mechanism.

As a result of the determination in the step S401, when the operation-detected sheet feeder is equipped with the lock mechanism, the control unit 205 determines whether or not the operation-detected sheet feeder has already been reserved (step S402).

Figure 15A:
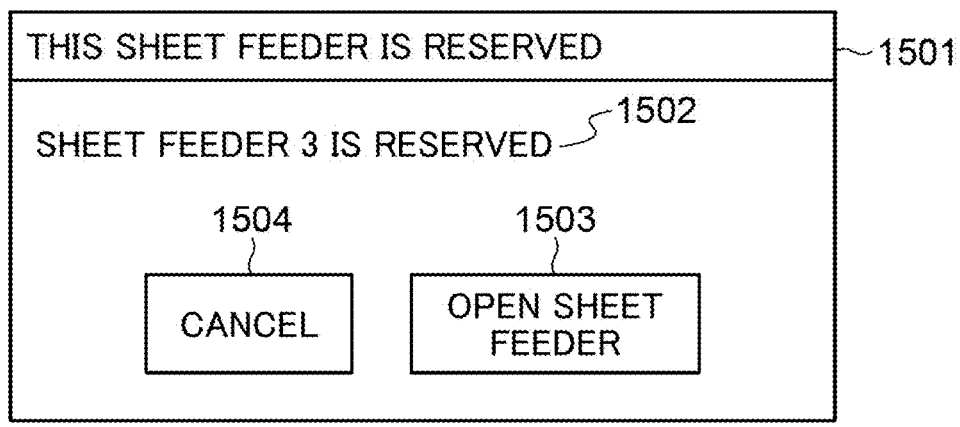
FIGS. 15A and 15B are views showing examples of a reservation notification screen which is displayed on the operating unit in FIG. 2.

As a result of the determination in the step S402, when the operation-detected sheet feeder has already been reserved, the control unit 205 displays a reservation notification screen 1501 in FIG. 15A on the operating unit 204 (step S403). The reservation notification screen 1501 is comprised of a message 1502 indicating that the operation-detected sheet feeder has already been reserved, an unlock button 1503, and a cancel button 1504. The unlock button 1503 is an operating button for unlocking the operation-detected sheet feeder. The cancel button 1504 is an operating button for closing the reservation notification screen 1501. When the user depresses either of the unlock button 1503 and the cancel button 1504 (YES in step S404), the control unit 205 determines whether the depressed operating button is the unlock button 1503 or the cancel button 1504 (step S405).

As a result of the determination in the step S405, when the depressed operating button is the unlock button 1503, the control unit 205 unlocks the operation-detected sheet feeder and opens the operation-detected sheet feeder (step S406) (see the step S307 in FIG. 12, for example). Then, the control unit 205 cancels the reservation of the operation-detected sheet feeder (step S407) (see the step S308 in FIG. 12, for example), followed by the present process being terminated.

As a result of the determination in the step S401, when the operation-detected sheet feeder is not equipped with the lock mechanism, the control unit 205 determines whether or not the operation-detected sheet feeder has already been reserved based on the management table 901 (step S408).

Figure 15B:
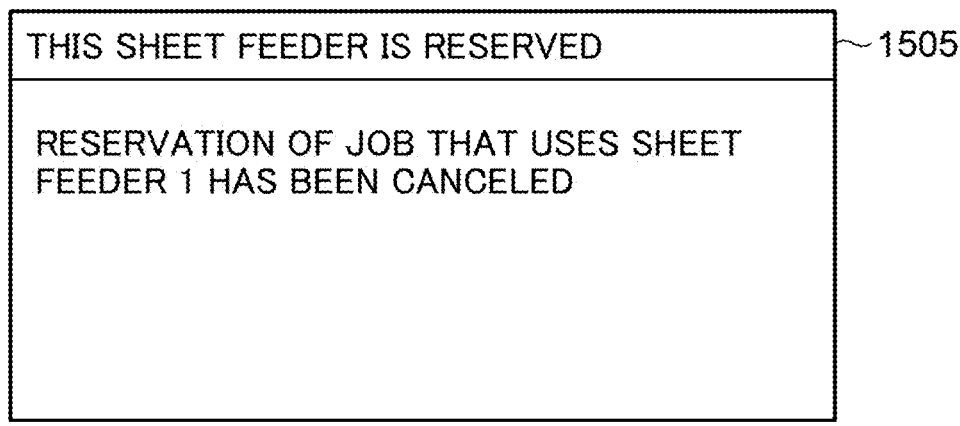

As a result of the determination in the step S408, when the operation-detected sheet feeder has already been reserved, the control unit 205 displays a reservation notification screen 1505 in FIG. 15B, which indicates that the operation-detected sheet feeder has already been reserved, on the operating unit 204 (step S409). The control unit 205 also cancels the reservation of the operation-detected sheet feeder (step S407) (see the step S313 in FIG. 12, for example), followed by the present process being terminated.

As a result of the determination in the step S402 or S408, when the operation-detected sheet feeder has not been reserved yet, or as a result of the determination in the step S405, when the depressed operating button is the cancel button 1504, the control unit 205 terminates the present process.

Figure 16:
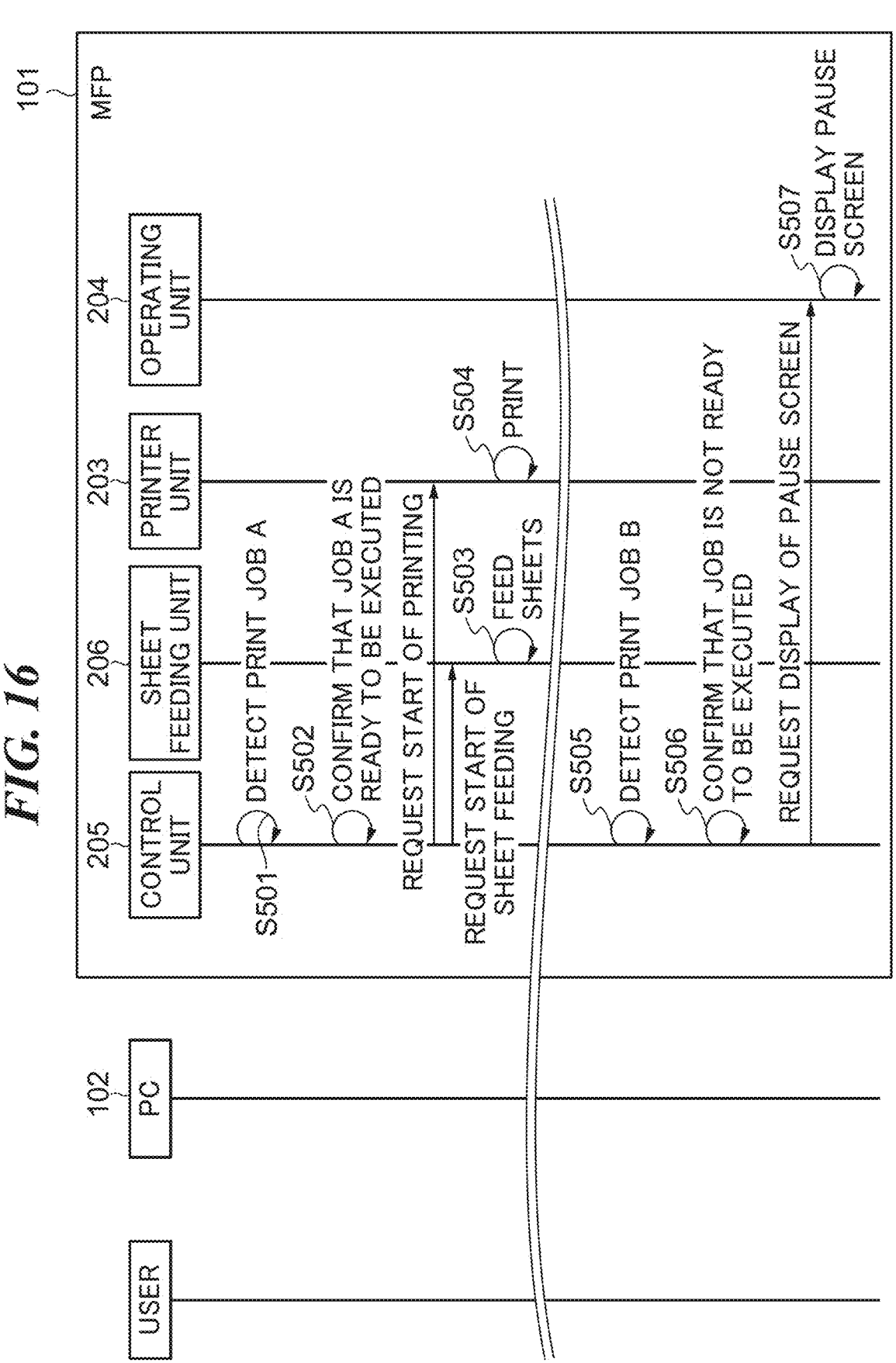
FIG. 16 is a sequence diagram showing the procedure of a process of executing, in the MFP in FIG. 1, a print job for which a sheet feeder has been reserved and a print job for which a reservation of a sheet feeder has been canceled are executed.
Figure 18:
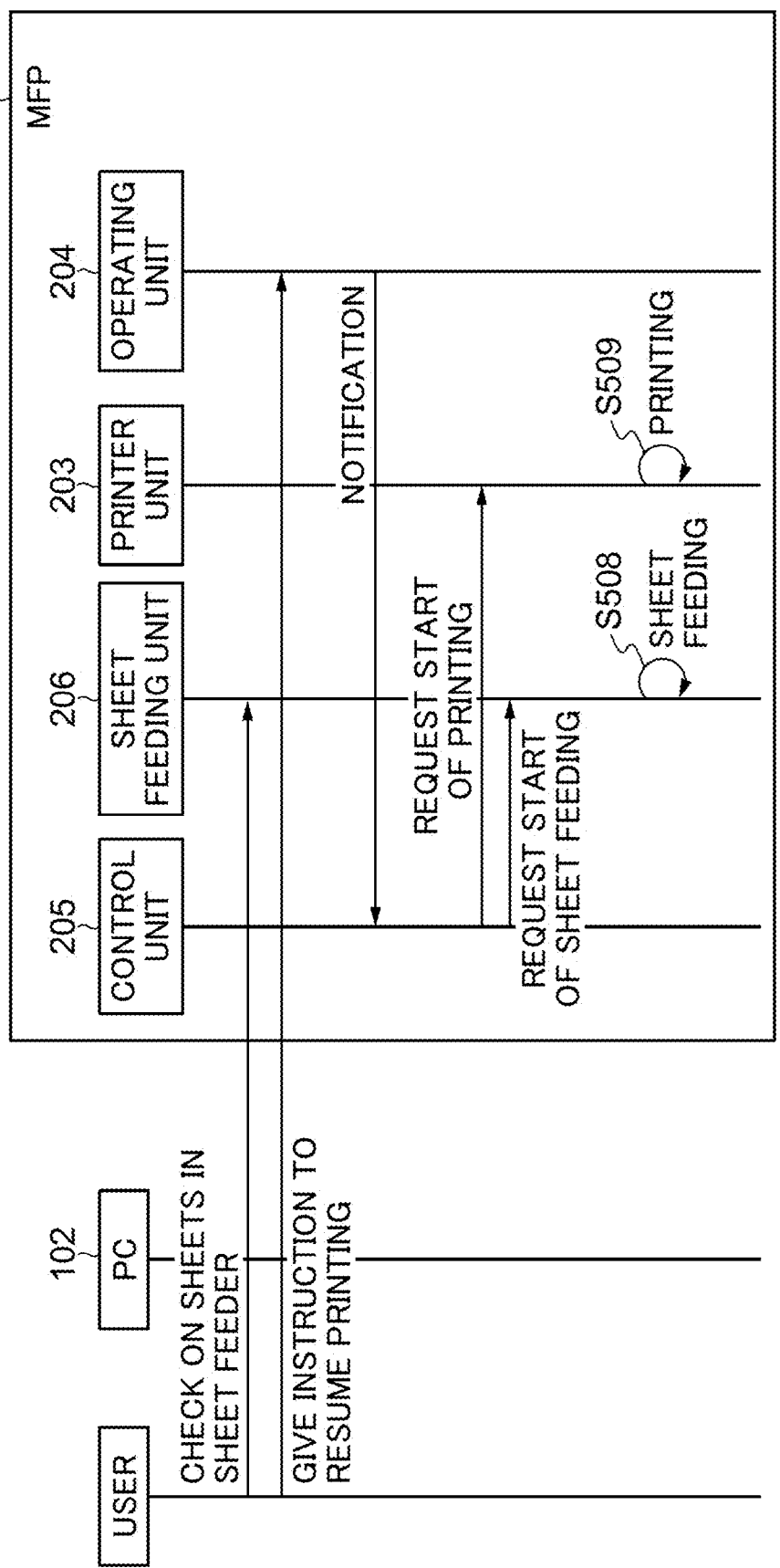
FIG. 18 is a sequence diagram showing the procedure of a process of executing, in the MFP in FIG. 1, a print job for which a sheet feeder has been reserved and a print job for which a reservation of a sheet feeder has been canceled.

FIGS. 16 and 18 are sequence diagrams showing the procedure of processes of executing, in the MFP 101 in FIG. 1, a print job for which a sheet feeder has been reserved and a print job for which reservation of a sheet feeder has been canceled. The processes in FIGS. 16 and 18 are based on the assumption that, for example, the sheet feeding cassette 411 corresponding to the sheet feeder number "2" is reserved as a sheet feeder for use in a print job A, and a reservation of a sheet feeder for use in a print job B executed subsequently to the print job A has been canceled.

Referring to FIGS. 16 and 18, first, upon detecting the print job A in the print queue (step S501), the control unit 205 determines whether or not the print job A is ready to be executed based on a management table 1302. When the print job A is ready to be executed (step S502), the control unit 205 issues a sheet feeding start request to the sheet feeding unit 206 and also issues a printing start request to the printer unit 203. The sheet feeding unit 206 that has received the printing start request starts feeding sheets for the print job A (step S503). The printer unit 203 that has received the printing start request starts printing for the print job A (step S504). Upon completing execution of the print job A, the control unit 205 deletes information on the print job A from the management table 1302 to update the job execution order 902 (see a management table 1701 in FIG. 17, for example).

Next, upon detecting the print job B in the print queue (step S505), the control unit 205 determines whether or not the print job B is ready to be executed based on the management table 1701. When the print job B is not ready to be executed (step S506), the control unit 205 displays a pause screen on the operating unit 204 (step S507) and prompts the user to check on sheets in the sheet feeder. Then, upon receiving a print resuming instruction from the user, the operating unit 204 notifies the control unit 205 to that effect. The control unit 205 that has received this notification issues a sheet feeding start request to the sheet feeding unit 206 and also issues a printing start request to the printer unit 203. The sheet feeding unit 206 that has received the sheet feeding request starts feeding sheets for the print job B (step S508). The printer unit 203 that has received the printing start request starts printing for the print job B (step S509).

Figure 19:
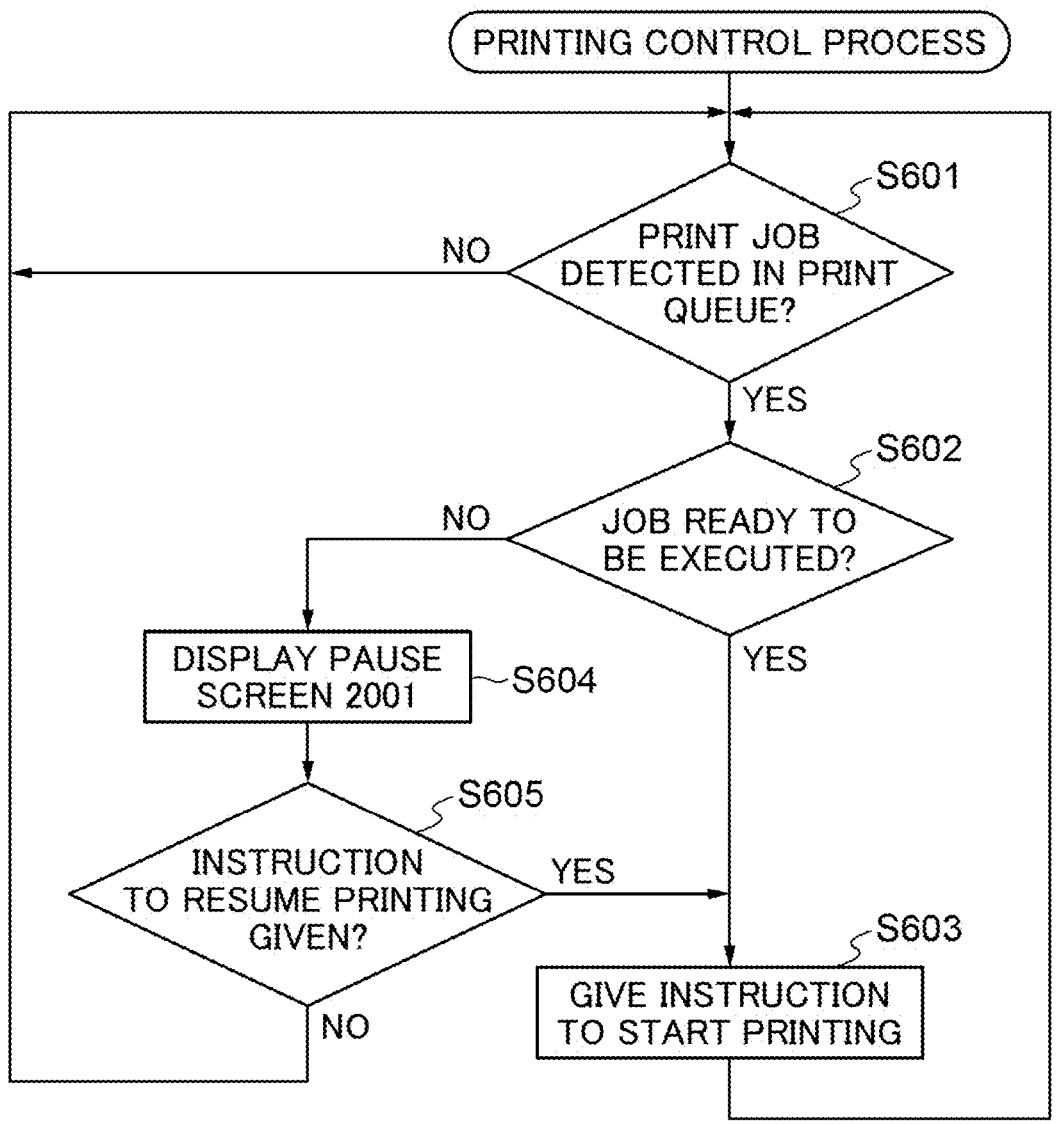
FIG. 19 is a flowchart showing the procedure of a print control process which is carried out by the MFP in FIG. 1.

FIG. 19 is a flowchart showing the procedure of a print control process that is carried out by the MFP 101 in FIG. 1.

The process in FIG. 19 is also implemented by the control unit 205 executing programs stored in the ROM 207 or the like. The process in FIG. 19 is carried out when print jobs are detected in the print queue.

Referring to FIG. 19, when print jobs are detected in the print queue (YES in step S601), the control unit 205 determines whether or not the print job submitted to the print queue first (hereafter referred to as "the first print job") is ready to be executed (step S602). In the step S602, for example, when the job executable/non-executable 907 for the first print job is "YES" as with the first print job A in the management table 1302, the control unit 205 determines that the first print job is ready to be executed. On the other hand, when the job executable/non-executable 907 for the first print job is "NO" as with the first print job B in the management table 1701, the control unit 205 determines that the first print job is not ready to be executed.

As a result of the determination in the step S602, when the first print job is ready to be executed (see the step S502 in FIG. 16, for example), the control unit 205 issues a sheet feeding start request to the sheet feeding unit 206 (see the step S503 in FIG. 16, for example). In response to this, the sheet feeding unit 206 starts feeding sheets for the first print job (see the step S5032 in FIG. 16, for example). The control unit 205 also issues a printing start request to the printer unit 203 (step S603). In response to this, the printer unit 203 starts printing for the first print job (see the step S504 in FIG. 16, for example). Upon completing execution of the first print job, the control unit 205 deletes information on the first print job from the management table 901, followed by the process returning to the step S601.

As a result of the determination in the step S602, when the first print job is not ready to be executed (see the step S506 in FIG. 16, for example), the control unit 205 identifies sheet feeder numbers of sheet feeders that can be reserved. For example, referring to the status of the registration in the management table 1701, the control unit 205 identifies the sheet feeder numbers "1", "2", and "3" other than those of the sheet feeders for which "Reserved" is set in the management table 1701 as the sheet feeder numbers of the sheet feeders that can be reserved. Then, the control unit 205 displays a pause screen 2001 in FIG. 20 on the operating unit 204 (step S604). On the pause screen 2001, only operating buttons indicating the sheet feeder numbers identified from among the sheet feeder numbers "1" to "5" are displayed. After that, the control unit 205 determines whether or not a print resuming instruction has been issued via the pause screen 2001 (step S605). In the step S605, for example, when an OK button 2003 is depressed in a state where an operating button 2002 indicating the identified sheet feeder number is selected, the control unit 205 determines whether or not the print resuming instruction has been issued via the pause screen 2001. On the other hand, when a cancel button 2004 is selected, the control unit 205 determines whether or not no print resuming instruction has been issued via the pause screen 2001.

As a result of the determination in the step S605, when the print resuming instruction has been issued via the pause screen 2001, the control unit 205 carries out the processes in the step S603 and the subsequent steps.

When the control unit 205 determines in the step S605 that no print resuming instruction has been issued via the pause screen 2001, the process returns to the step S601.

According to the embodiment described above, the user reserves a sheet feeder for use in a print job from among a plurality of sheet feeders of the sheet feeding unit 206, and control is provided such that the reserved sheet feeder cannot be used for another print job other than the above print job. This prevents sheets in a sheet feeder from being used for another print job other than a print job for which use of the sheet feeder has been reserved by the user.

Moreover, in the embodiment described above, control is provided such that a sheet feeder reserved in advance by the user on the reservation screen 1001 cannot be reserved by another user. This prevents a plurality of users from making duplicate reservations of the sheet feeder.

Furthermore, in the embodiment described above, print jobs are submitted to the print queue when a sheet feeder for use in the print jobs submitted to the print queue is reserved by the user on the reservation screen 1001. Namely, even if the user does not issue a printing start instruction for a print job submitted to the hold queue, the print job is executed only by reserving a sheet feeder for use in the print job. This avoids degradation of operability caused by preventing sheets in a sheet feeder reserved for use in a print job from being used for another print job other than the print job.

In the embodiment described above, the reservation notification screens 1501 and 1505 are displayed when a user performs a sheet feeder-related operation on a sheet feeder that has already been reserved by another user. This notifies the user that the sheet feeder has already been reserved.

Moreover, in the embodiment described above, a predicted time period that elapses until a reservation of a sheet feeder is canceled. This enables a user who wants to use a sheet feeder reserved by another user to easily make a plan to use the reserved sheet feeder.

Next, a description will be given of a process that is carried out when the user has issued an instruction to submit a print job to the print queue in the communication system 100. It should be noted that this process is basically the same as the above described process that is carried out when the user has issued an instruction to submit a print job to the hold queue, and therefore, only features that are different from those of the above described process will be described below.

Figure 21:
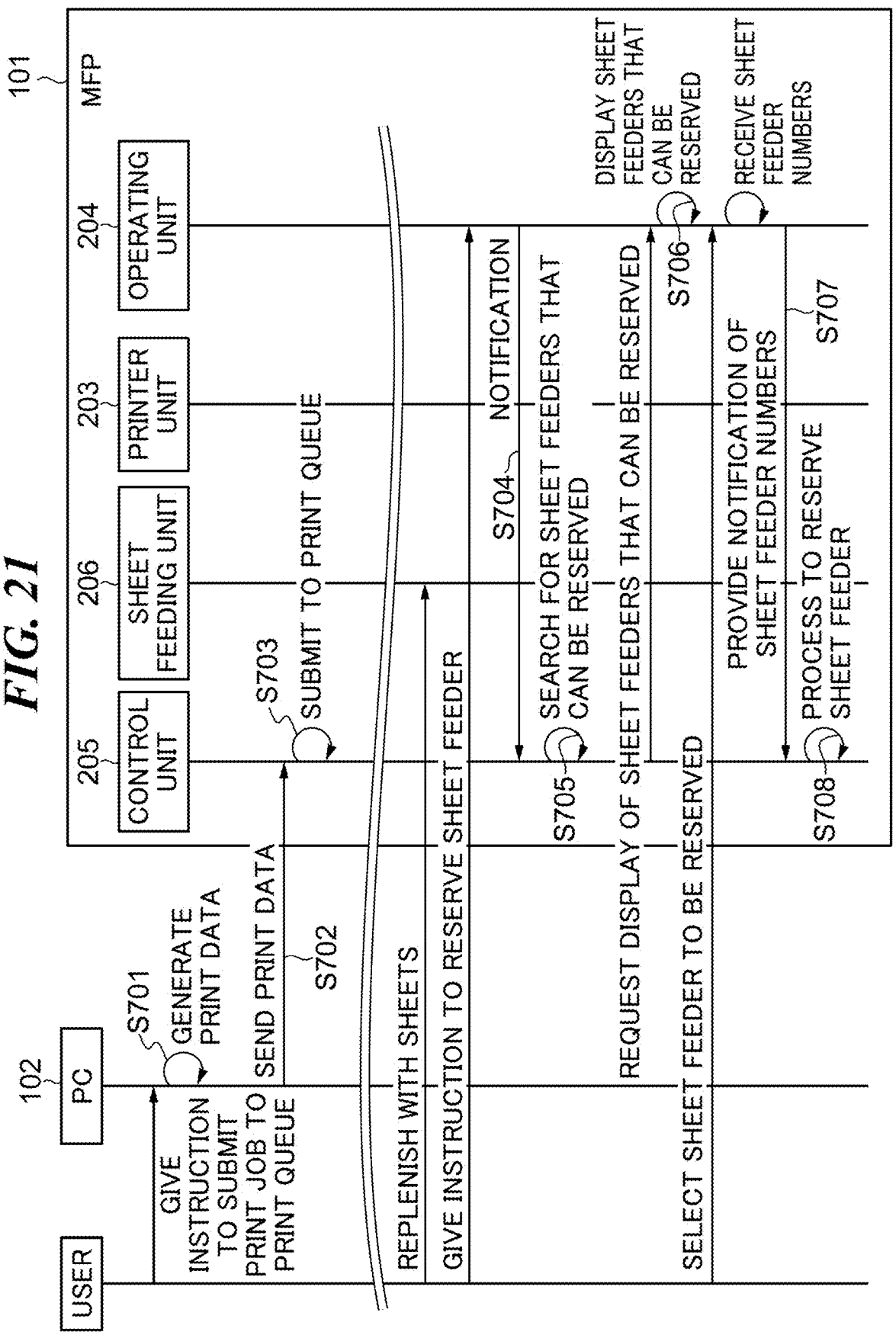
FIG. 21 is a sequence diagram showing the procedure of a process from issuance of an instruction to submit a print job to a hold queue in the PC in FIG. 1 to reservation of a sheet feeder for use in the print job in the MFP in FIG. 1.

FIG. 21 is a sequence diagram showing the procedure of a process from issuance of an instruction to, submit print jobs to the hold queue in the PC 102 in FIG. 1 to reservation of a sheet feeder for use in the print jobs in the MFP 101.

Referring to FIG. 21, when the user issues an instruction to submit the print jobs to the print queue by operating the PC 102, the PC 102 generates print data for which a submission destination is set to the print queue (step S701). The PC 102 then submits the print job corresponding to the generated print data to the MFP 101 (step S702). The MFP 101 that has received the print data submits the print jobs to the print queue (step S703). After that, the user who has moved from the PC 102 to the MFP 101 replenishes the sheet feeding unit 206 with sheets and also operates the operating unit 204 to issue a sheet feeder reserving instruction for the print jobs submitted to the print queue, the operating unit 204 notifies the control unit 205 that it has received the sheet feeder reserving instruction (step S704). The operating unit 204 also displays list information on the print jobs submitted to the print queue and notifies the control unit 205 of a selected print job in the list information. The control unit 205 that has received the notification indicating the selected print job searches for sheet feeders that can be reserved (step S705) and requests the operating unit 204 to display the sheet feeders that can be reserved. The operating unit 204 displays the sheet feeders that can be reserved as candidates for a sheet feeder for use in the selected print job (step S706). After that, the control unit 205 is notified of a sheet feeder number indicating a sheet feeder selected by the user from among the sheet feeders that can be reserved, which are displayed on the operating unit 204 (step S707). The control unit 205 that has obtained the sheet feeder number from the operating unit 204 carries out a reservation process to reserve the sheet feeder indicated by the obtained sheet feeder number.

Figure 22:
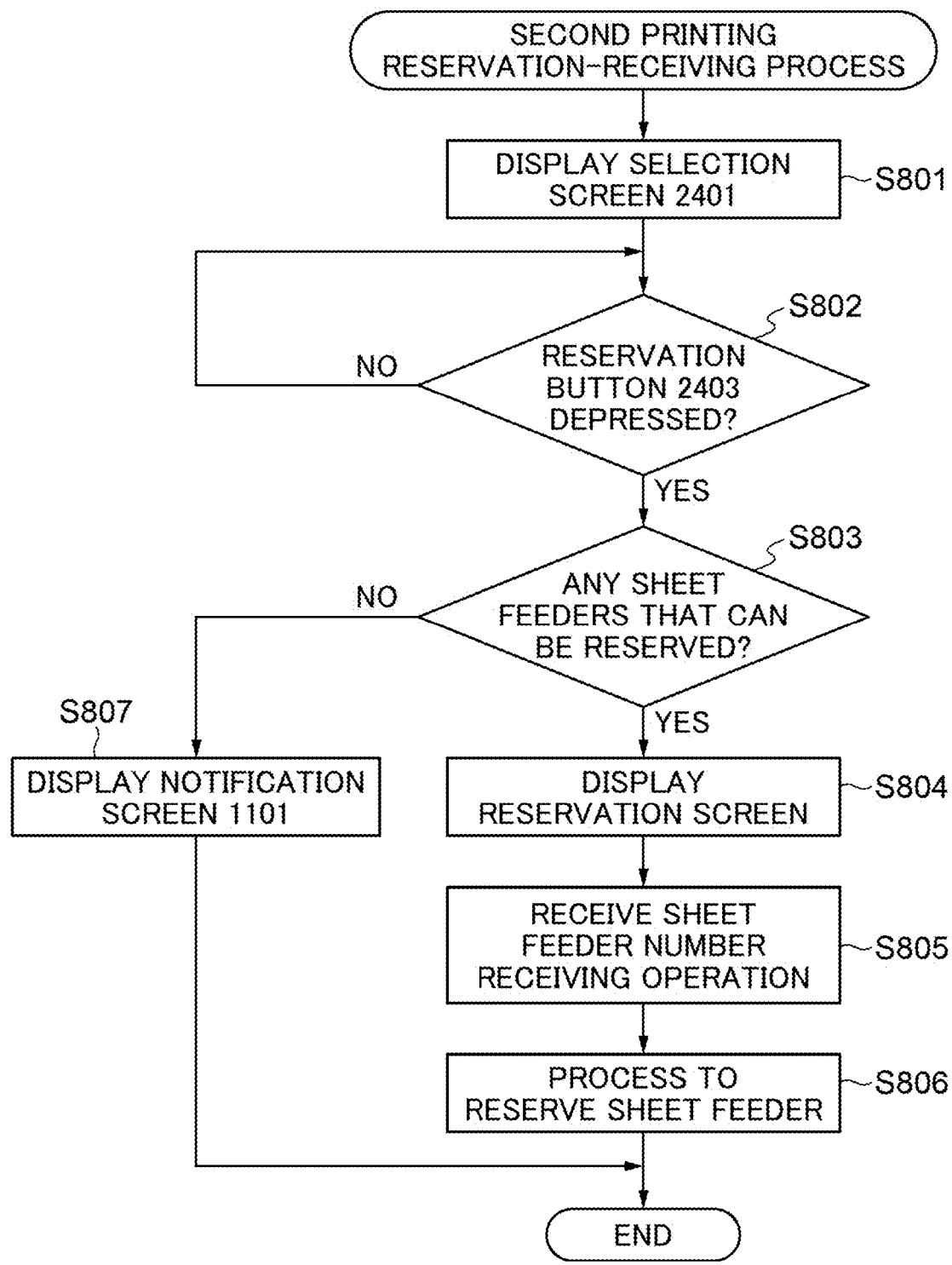
FIG. 22 is a flowchart showing the procedure of a second print reservation-receiving process which is carried out by the MFP in FIG. 1.

FIG. 22 is a flowchart showing the procedure of a second print reservation-receiving process that is carried out by the MFP 101 in FIG. 1.

The process in FIG. 22 is also implemented by the control unit 205 executing programs stored in the ROM 207 and the like and is carried out when an instruction to reserve a sheet feeder for a print job submitted to the print queue is received via the operating unit 204. The process in FIG. 22 is based on the assumption that, for example, registrations are made as shown in a management table 2301 in FIG. 23A.

Referring to FIG. 22, first, the control unit 205 obtains list information on print jobs submitted to the print queue. Based on the obtained list information, the control unit 205 displays a selection screen 2401 in FIG. 24 on the operating unit 204 (step S801). The selection screen 2401 is an operating screen for reserving a sheet feeder for a print job submitted to the print queue. The user is able to see, on the selection screen 2401, an execution order of print jobs submitted to the print queue, sheet feeders for the print jobs, and reservation statuses of the respective print jobs. When the user depresses a reservation button 2403 in a state where, for example, a print job E is selected from list information 2402 (step S802), the control unit 205 searches for sheet feeders that can be reserved (refer to the step S705 in FIG. 21, for example). Specifically, based on the management table 2301, the control unit 205 determines whether or not there are sheet feeders that can be reserved (step S803).

As a result of the determination in the step S803, when there are sheet feeders that can be reserved, the control unit 205 displays, on the operating unit 204, a reservation screen (not shown) for reserving a sheet feeder to be used for the selected print job E (step S804). On this reservation screen, only sheet feeders that can be reserved from among the sheet feeders of the sheet feeding unit 205, for example, the sheet feeder with the sheet feeder number "3", which is not registered in the management table 2301, are displayed in a selectable manner. Upon receiving an operation by the user to select the sheet feeder with the sheet feeder number "3" via the reservation screen (step S805), the control unit 2005 carries out a process to reserve the sheet feeder for the print job E (step S806). In the process to reserve the sheet feeder for the print job E, the control unit 205 registers information on the print job E in the management table 2301. As the information on the print job E in the management table 2301, for example, the sheet feeder number "3" is set in the number 904, "Reserved" is set in the reservation status 905, and "YES" is set in the job executable/non-executable 905 of the management table 2301 as shown in FIG. 23B. As a result, the sheet feeding deck 412 corresponding to the sheet feeder number "3" cannot be used for any job other than the print job E until execution of the print job E is completed, followed by the present process being terminated.

As a result of the determination in the step S803, when there is no sheet feeder that can be reserved, the control unit 205 calculates predicted time periods that elapse until reservations of the respective sheet feeders are canceled, and based on the calculated results, and displays the notification screen 1101 on the operating unit 204 (step S807), followed by the present process being terminated.

In the manner described above, a sheet feeder is reserved for a print job submitted to the print queue as well, and the reserved sheet feeder is prevented from being used for another job other than the print job.

Next, a description will be given of a second embodiment of the present invention.

The second embodiment of the present invention is basically the same as the first embodiment described above in terms of constructions and operations. The second embodiment, however, differs from the first embodiment in that printing using a continuation confirmation function (hereafter referred to as "the continuation confirmed printing") is performed in the communication system 100. Features of constructions and operations that are the same as those in the first embodiment will thus not be described, only constructions and operations different from those of the first embodiment being described below.

Figure 25:
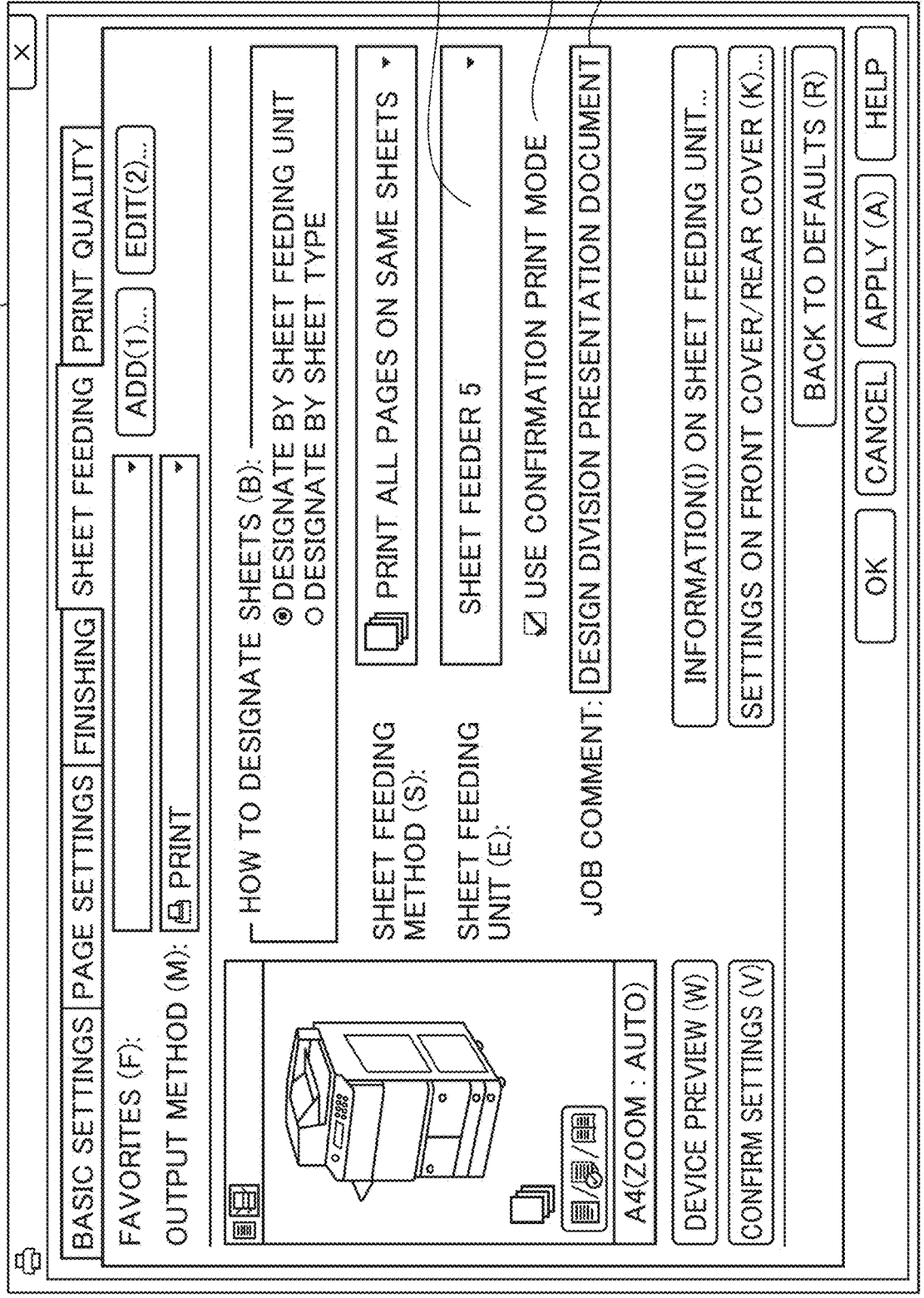
FIG. 25 is a view showing an example of a print instruction screen which is displayed on the PC in FIG. 1.

In the communication system 100, an instruction to perform the continuation confirmed printing can be issued from the PC 102 to the MFP 101. In the continuation confirmed printing, when the user is to feed sheets from a predetermined sheet feeder, the MFP 101 suspends printing immediately before feeding of the sheets is started and also prompts the user to confirm continuation of printing. The user issues an instruction to perform the continuation confirmed printing on a printing instruction screen 2501 in FIG. 25 displayed on the PC 102. Specifically, the user selects a sheet feeding unit option 2502 on the printing instruction screen 2501 and places a checkmark in a radio button 2503 for a message "Use Confirmation Print Mode". The user also enters a character spring, which is to be displayed when continuation of printing is confirmed is displayed, in a job comment field 2504 and depresses a print button, not shown. In the job comment field 2504, such a message as "Designing Department Presentation Document" is displayed so as to be easily recognizable at a glance by the user.

Figure 26:
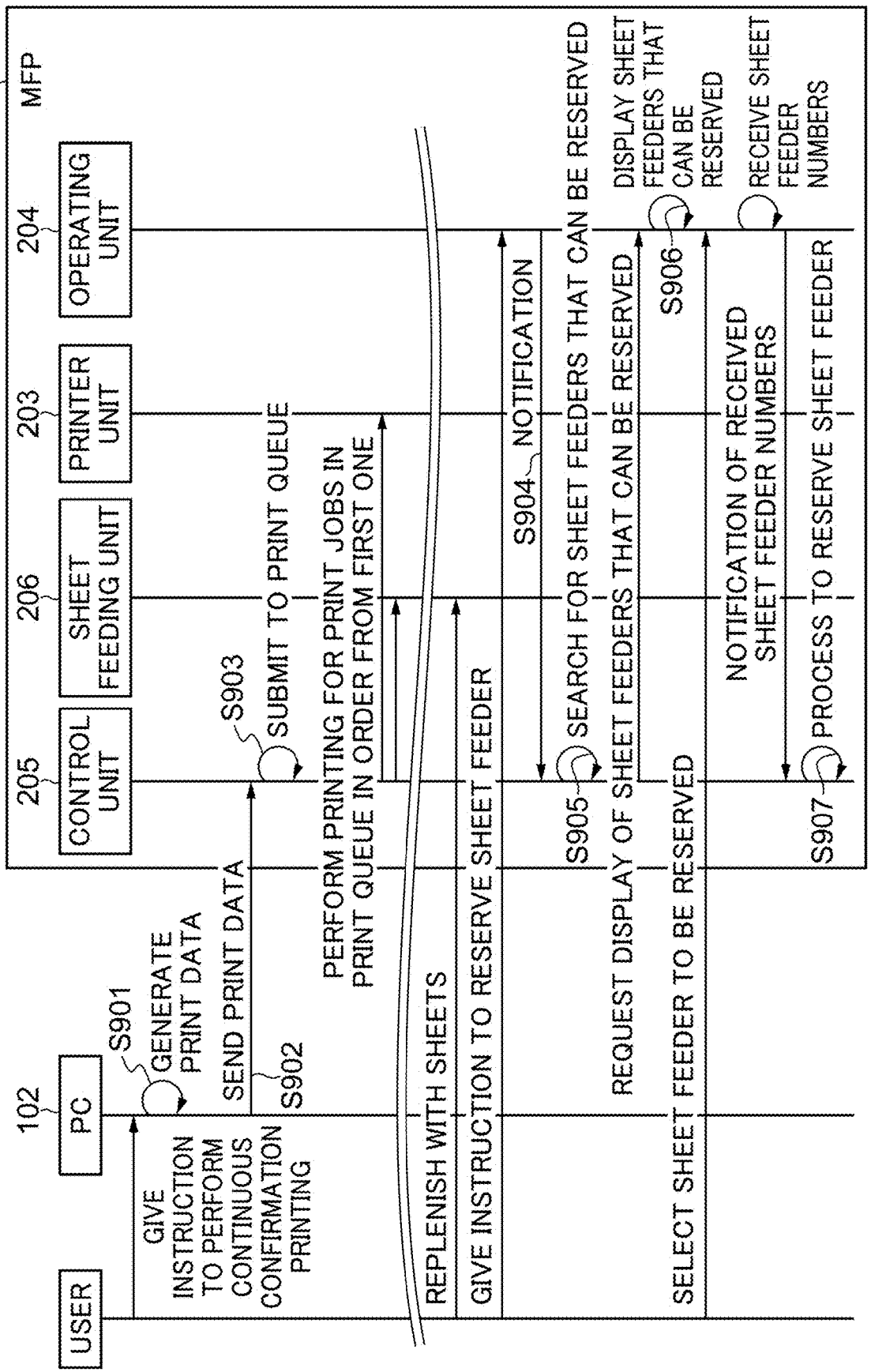
FIG. 26 is a sequence diagram showing the procedure of a process from issuance of an instruction to perform continuance confirmed printing in the PC in FIG. 1 to reservation of a sheet feeder for use in the continuance confirmed printing in the MFP in FIG. 1.

FIG. 26 is a sequence diagram showing the procedure of a process from issuance of an instruction to perform the continuance confirmed printing in the PC 102 in FIG. 1 to reservation of a sheet feeder for use in the continuance confirmed printing in the MFP 101.

Referring to FIG. 26, when the user issues an instruction to perform the continuation confirmed printing on the printing instruction screen 2501 displayed on the PC 102, the PC 102 generates print data including settings on the continuation confirmed printing (step S901). The PC 102 then sends the generated print data to the MFP 101 (step S902). The MFP 101 that has received the print data submits print jobs corresponding to the print data to the print queue (step S903). In the MFP 101, the print jobs submitted to the print queue are printed in order from a first one. After that, the user who has moved from the PC 102 to the MFP 101 replenishes the sheet feeding unit 206 with sheets, and further, when the user operates the operating unit 204 to issue a sheet feeder reserving instruction for the print jobs submitted to the print queue, the operating unit 204 notifies the control unit 205 that the sheet feeder reserving instruction has been received (step S904). The operating unit 204 also displays list information on the print jobs submitted to the print queue and notifies the control unit 205 of a selected print job in the list information.

Figure 27:
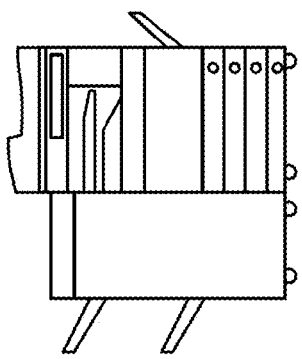
FIG. 27 is a view showing an example of a reservation screen which is displayed on the operating unit in FIG. 2.

The control unit 205 that has received the notification indicating the selected print job searches for sheet feeders that can be reserved (step S905) and requests the operating unit 204 to display the sheet feeders that can be reserved. The operating unit 204 displays the sheet feeders that can be reserved as candidates for a sheet feeder for use in the selected print job (step S906). Specifically, the operating unit 204 displays a reservation screen 2701 in FIG. 27. The reservation screen 2701 includes a character string 2701 designated in the job comment field 2504 on the printing instruction screen 2501 as well as the sheet feeders that can be reserved. After that, the control unit 205 carries out a process to reserve a sheet feeder with a sheet feeder number selected by the user on the reservation screen 2701 (step S907) and registers information on the print job selected by the user in a management table 2801 in FIG. 28. The management table 2801 includes the a confirmation print mode 2802 as well as the ob execution order 902, job name 903, number 904, reservation state 905, lock mechanism 906, and job executable/non-executable 907 in the management table 901 and others described above. Information indicating whether or not to perform the continuation confirmed printing for the print job selected by the user is designated as the confirmation print mode 2802.

Figure 29:
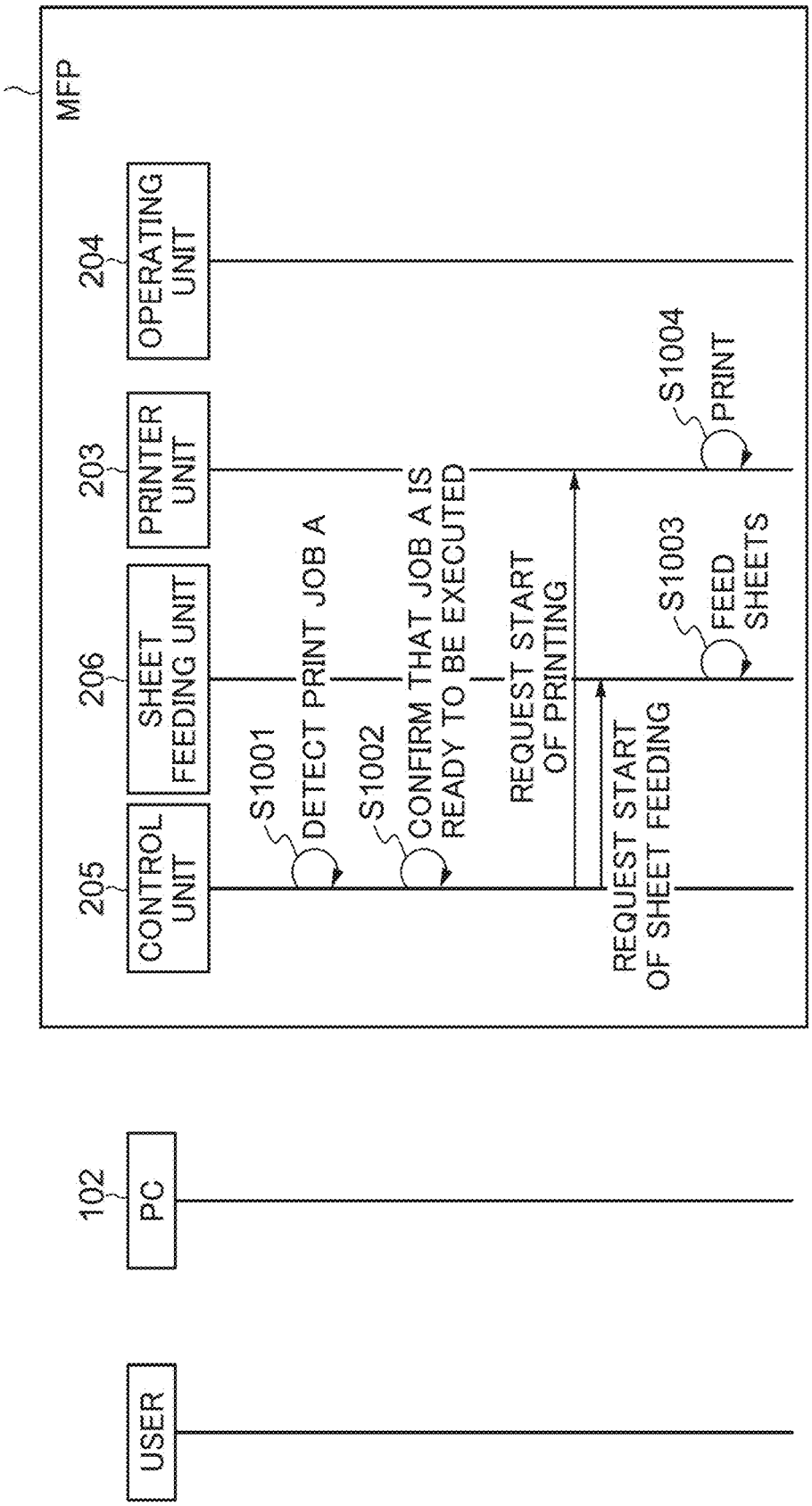
FIG. 29 is a sequence diagram showing the procedure of a process of executing, in the MFP in FIG. 1, a print job for which no sheet feeder has been reserved and a continuance confirmed print job.
Figure 30:
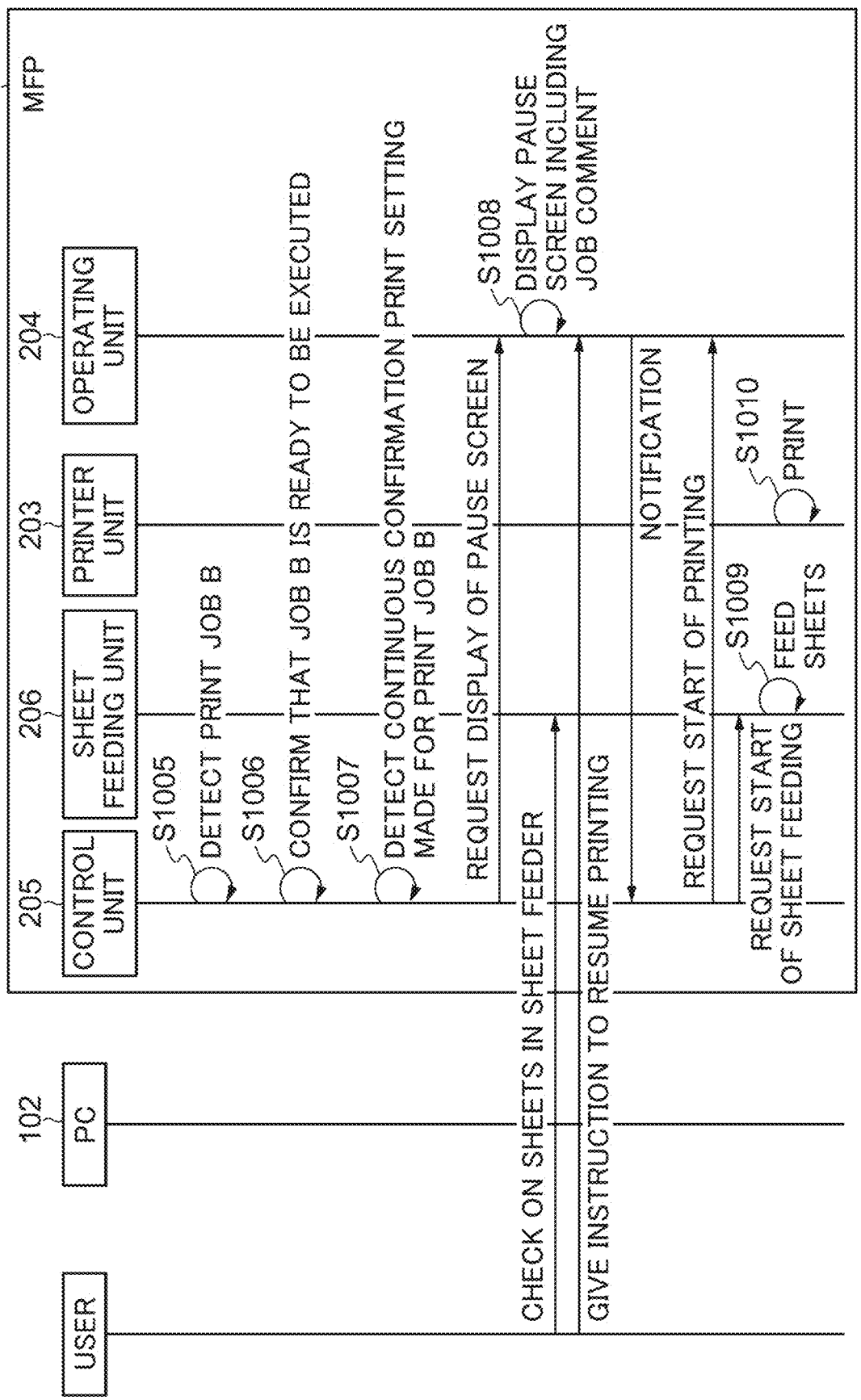
FIG. 30 is a sequence diagram showing the procedure of a process of executing, in the MFP in FIG. 1, a print job for which no sheet feeder has been reserved and a continuance confirmed print job.

FIGS. 29 and 30 are sequence diagrams showing the procedure of a process of executing, in the MFP 101 in FIG. 1, a print job for which a sheet feeder to be used has not been reserved and a continuance confirmation print job. The process in FIGS. 29 and 30 is based on the assumption that, for example, print jobs A, B, and C are registered in this order as in a management table 3101 in FIG. 31A. In the management table 3101, for the print job A, the reservation state 905 is set to "Not Reserved", and the job execution/non-execution 907 is set to "YES". For the print job B, the confirmation print mode 2802 is set to "OFF", the reservation state 905 is set to "Reservation Cancelled", and the job executable/non-executable 907 is set to "NO". For the print job C, the reservation state 905 is set to "Reservation Cancelled".

Referring to FIGS. 29 and 30, upon detecting the print job A in the print queue (step S1001), the control unit 205 determines whether or not the print job A is ready to be executed based on the management table 3101. When the print job A is ready to be executed (step S1002), the control unit 205 assigns a sheet feeder in which sheets of a sheet size designated for print data of the print job A are stored, from among sheet feeders that have not yet been reserved to the print job A. Namely, in the present embodiment, one of sheet feeders other than sheet feeders that have already been reserved on the reservation screen 2701 is, assigned to a print job for which no sheet feeder has been reserved on the reservation screen 2701. Then, the control unit 205 issues a sheet feeding start request to the sheet feeding unit 206 and also issues a printing start request to the printer unit 203. The sheet feeding unit 206 that has received the sheet feeding start request starts feeding sheets for the print job A from the assigned sheet feeder (step S1003). The printer unit 203 that has received the printing start request starts printing for the print job A (step S1004). Upon completing execution of the print job A, the control unit 205 deletes information on the print job A from the management table 3101 to update the job execution order 902 (see a management table 3102 in FIG. 31B, for example).

Next, upon detecting the print job B in the print queue (step S1005), the control unit 205 determines whether or not the print job B is ready to be executed based on the management table 3102. When the print job B is not ready to be executed (step S1006), and a continuous conformation print setting made for the print job B is detected (step S1007), the control unit 205 requests the operating unit 204 to display a pause screen. The operating unit 204 displays the pause screen including a character string set in the job comment field 2504 of the printing instruction screen 2501 (step S1008) and prompts the user to check on sheets in the sheet feeder. Then, upon receiving a print resuming instruction from the user, the operating unit 204 notifies the control unit 205 to that effect. The control unit 205 that has received this notification issues a sheet feeding start request to the sheet feeding unit 206 and also issues a printing start request to the printer unit 203. The sheet feeding unit 206 that has received the sheet feeding request starts feeding sheets for the print job B (step S1009). The printer unit 203 that has received the printing, start request starts printing for the print job B (step S1010). Upon completing execution of the print job B, the control unit 205 deletes information on the print job B from the management table 3102 to update the job execution order 902 (see a management table 3103 in FIG. 31C, for example).

Figure 32:
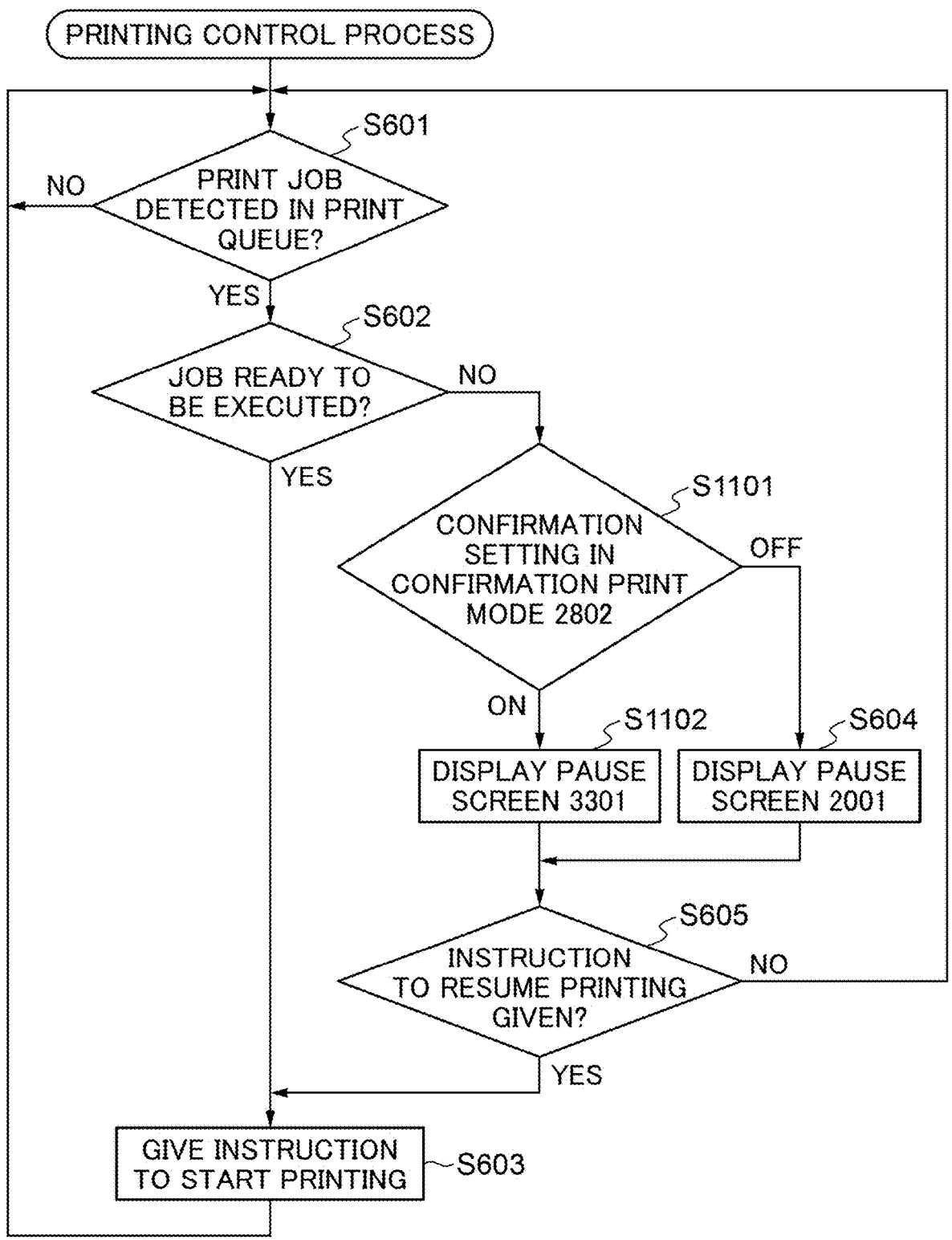
FIG. 32 is a flowchart showing the procedure of a variation of the print control process in FIG. 19.

FIG. 32 is a flowchart showing the procedure of a variation of the print control process in FIG. 19.

The process in FIG. 32 is also implemented by the control unit 205 executing programs stored in the ROM 207 and the like and is carried out when print jobs are detected in the print queue.

Referring to FIG. 32, the control unit 205 carries out the processes in the steps S601 and S602.

As a result of the determination in the step S602, when the first print job is ready to be executed, the control unit 205 carries out the processes in the step S603 and the subsequent steps. On the other hand, as a result of the determination in the step S602, when the first print job is not ready to be executed, the control unit 205 confirms a setting on the confirmation print mode 2802 regarding the first print job (step S1101).

As a result of the determination in the step S1101, when the confirmation print mode 2802 for the first print job is set to "OFF", the control unit 205 carries out the processes in the step S604 and the subsequent steps. On the other hand, as a result of the determination in the step S1101, when the confirmation print mode 2802 for the first print job is set to "ON" (refer to the step S1007 in FIG. 30, for example), the control unit 205 identifies sheet feeder numbers of sheet feeders that can be reserved. For example, referring to the status of the registration in the management table 3101, the control unit 205 identifies the sheet feeder numbers "1", "2" "3", "4", and "5" other than those of sheet feeders for which "Reserved" is set in the management table 3101 as the sheet feeder numbers of the sheet feeders that can be reserved. Then, the control unit 205 displays a pause screen 3301 in FIG. 33, which is for reserving a sheet feeder for use in the first print job, on the operating unit 204 (step S1102). On the pause screen 3301, operating buttons indicating the identified sheet feeder numbers are displayed in a selectable manner, and a character string 3302 "Design Department Presentation Document" set in the job comment field 2504 on the printing instruction screen 2501 is displayed. Namely, in the present embodiment, the pause screen 3301 is displayed on the operating unit 204 for only a print job that cannot be executed due to cancellation of a sheet feeder. The control unit 205 then carries out the processes in the step S605 and the subsequent steps.

In the second embodiment describe above, one of sheet feeders other than sheet feeders that have already been reserved on the reservation screen 2701 is assigned to a print job for which no sheet feeder has been reserved on the reservation screen 2701. This prevents sheet feeders that have already been reserved from being used for a print job for which no sheet feeder has been reserved on the reservation screen 2701.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-221882, filed Nov. 17, 2017 which is hereby incorporated by reference herein in its entirety.

What is claimed is:

1. An image forming apparatus having sheet holding units that hold sheets to be fed, comprising:
   a controller including a processor and a memory;
   a display; and
   a printing unit,
   wherein the controller is configured to:
   store print jobs;
   specify one or more sheet holding units that are designated by the stored print jobs;
   cause the display to display a screen in which the specified one or more sheet holding units that are designated by the stored print jobs are not selectable and sheet holding units other than the specified one or more sheet holding units are selectable;

receive a selection by a user of a sheet holding unit from among the sheet holding units other than the specified one or more sheet holding units; and reserve another print job designating the selected sheet holding unit, wherein the reserved another print job is processed after the stored print jobs are processed.

2. The image forming apparatus according to claim 1, wherein the controller is further configured to control the screen so that a sheet holding unit having already been selected by a user cannot be selected by another user other than the user who selected the sheet holding unit.

3. The image forming apparatus according to claim 1, wherein the controller is further configured to assign one sheet holding unit to a print job, for which none of the plurality of sheet holding units is selected, from among the plurality of sheet holding units other than the selected sheet holding unit.

4. The image forming apparatus according to claim 1, wherein the controller is further configured to:

store a print job, which is submitted in accordance with a submitting instruction given by the user, without immediately executing the print job;

execute print jobs managed in a predetermined queue; and submit the stored print job to the predetermined queue when one of the plurality of sheet holding units for use in the stored print job is selected by the user.

5. The image forming apparatus according to claim 1, wherein the controller is further configured to notify the user of a warning when a predetermined operation is performed on the selected sheet holding unit by another user other than the user.

6. The image forming apparatus according to claim 1, wherein a predicted time period that elapses when the not-selectable one or more sheet holding units becomes selectable is notified.

7. The image forming apparatus according to claim 1, wherein the controller is further configured to perform control so that sheets in the selected sheet holding unit are not fed for printing based on subsequent other print jobs.

8. The image forming apparatus according to claim 1, wherein the controller is further configured to lock the selected sheet holding unit so that users other than the user who has selected the sheet holding unit cannot open the selected sheet holding unit.

9. A control method for an image forming apparatus having a display and sheet holding units that hold sheets to be fed, the method comprising:

storing print jobs;

specifying one or more sheet holding units that are designated by the stored print jobs;

causing the display to display a screen in which the specified one or more sheet holding units that are designated by the stored print jobs are not selectable and sheet holding units other than the specified one or more sheet holding units are selectable;

receiving a selection by a user of a sheet holding unit from among the sheet holding units other than the specified one or more sheet holding units; and reserving another print job designating the selected sheet holding unit, wherein the reserved another print job is processed after the stored print jobs are processed.

10. A non-transitory computer-readable storage medium storing a control program for causing a computer to execute a control method for an image forming apparatus having a display and sheet holding units that hold sheets to be fed, the method comprising:

storing print jobs;

specifying one or more sheet holding units that are designated by the stored print jobs;

causing the display to display a screen in which the specified one or more sheet holding units that are designated by the stored print jobs are not selectable and sheet holding units other than the specified one or more sheet holding units are selectable;

receiving a selection by a user of a sheet holding unit from among the sheet holding units other than the specified one or more sheet holding units; and reserving another print job designating the selected sheet holding unit, wherein the reserved another print job is processed after the stored print jobs are processed.

* * * * *